United States Patent
Jackson et al.

(10) Patent No.: US 8,030,786 B2
(45) Date of Patent: Oct. 4, 2011

(54) SYSTEM FOR GENERATING ELECTRICAL ENERGY FROM AMBIENT ENERGY

(75) Inventors: Ronald Scott Jackson, Boise, ID (US); John F. Gardner, Boise, ID (US); David Harris, Eagle, ID (US)

(73) Assignee: Willowview Systems, Inc., Boise, ID (US)

( * ) Notice: Subject to any disclaimer, the term of this patent is extended or adjusted under 35 U.S.C. 154(b) by 686 days.

(21) Appl. No.: 12/196,971

(22) Filed: Aug. 22, 2008

(65) Prior Publication Data

US 2010/0045119 A1 Feb. 25, 2010

(51) Int. Cl.
*F02B 63/04* (2006.01)
*F03G 7/08* (2006.01)
*H02K 7/18* (2006.01)
*F02B 67/04* (2006.01)

(52) U.S. Cl. .......................... 290/1 R; 290/1 E; 290/54

(58) Field of Classification Search .................. 290/1 E, 290/1 R, 54
See application file for complete search history.

(56) References Cited

U.S. PATENT DOCUMENTS

| | | | | |
|---|---|---|---|---|
| 3,339,077 A * | 8/1967 | Shapiro | | 290/1 R |
| 3,366,865 A * | 1/1968 | Shapiro | | 320/101 |
| 3,475,856 A * | 11/1969 | May et al. | | 446/299 |
| 4,423,334 A * | 12/1983 | Jacobi et al. | | 290/53 |
| 5,460,099 A * | 10/1995 | Matsuhisa et al. | | 105/148 |
| 5,892,293 A * | 4/1999 | Lucas | | 290/1 R |
| 6,163,077 A * | 12/2000 | Lucas | | 290/1 R |
| 6,545,384 B1 * | 4/2003 | Pelrine et al. | | 310/309 |
| 6,619,523 B1 * | 9/2003 | Duckworth | | 224/634 |
| 6,700,248 B2 * | 3/2004 | Long | | 310/80 |
| 6,759,755 B2 * | 7/2004 | Sagov | | 290/1 R |
| 6,825,574 B1 * | 11/2004 | Mooring | | 290/1 R |
| 6,876,094 B2 * | 4/2005 | Jacobsen | | 290/1 R |
| 6,982,497 B2 * | 1/2006 | Rome | | 290/1 A |
| 7,009,315 B2 * | 3/2006 | Takeuchi | | 310/15 |
| 7,105,939 B2 * | 9/2006 | Bednyak | | 290/42 |
| 7,151,322 B2 * | 12/2006 | Eskandr | | 290/1 R |
| 7,239,038 B1 * | 7/2007 | Zimmerman et al. | | 290/54 |
| 7,245,062 B2 * | 7/2007 | Schmidt | | 310/330 |
| 7,304,398 B1 * | 12/2007 | Kim et al. | | 290/1 E |
| 7,345,372 B2 * | 3/2008 | Roberts et al. | | 290/1 R |
| 7,345,407 B2 * | 3/2008 | Tanner | | 310/339 |
| 7,361,999 B2 * | 4/2008 | Yeh | | 290/1 R |
| 7,375,436 B1 * | 5/2008 | Goldin | | 290/42 |
| 7,453,163 B2 * | 11/2008 | Roberts et al. | | 290/1 R |

(Continued)

FOREIGN PATENT DOCUMENTS

JP 2006097506 A * 4/2006

(Continued)

*Primary Examiner* — Pedro J Cuevas
(74) *Attorney, Agent, or Firm* — John R. Thompson; Stoel Rives LLP

(57) ABSTRACT

A system for generating electrical energy from ambient energy such as the energy of ambient motion and acoustic vibrations. The system has at least two stages, a resonating electrical generator and a kinetic energy conversion system. The stages have differing resonant frequencies to enable harvesting energy from lower frequency ambient motion and converting the energy to higher frequency resonant oscillation for efficiently generating electrical energy. A multiaxial system having a plurality of systems for generating electrical energy from ambient motion each oriented to be responsive to motion along a different axis. An embodiment of a system for generating electrical energy from ambient motion for which the resonating electrical generator is at least part of a driving mass of the kinetic energy conversion system.

32 Claims, 27 Drawing Sheets

U.S. PATENT DOCUMENTS

| | | | | |
|---|---|---|---|---|
| 7,476,984 B2* | 1/2009 | Kim et al. | | 290/1 E |
| 7,498,682 B2* | 3/2009 | Lemieux | | 290/1 R |
| 7,605,482 B2* | 10/2009 | Brown et al. | | 290/1 R |
| 7,626,279 B2* | 12/2009 | Brown et al. | | 290/1 R |
| 7,626,281 B2* | 12/2009 | Kawai | | 290/54 |
| 7,638,889 B2* | 12/2009 | Yeh | | 290/1 A |
| 7,692,320 B2* | 4/2010 | Lemieux | | 290/1 R |
| 7,703,562 B2* | 4/2010 | Kalik | | 180/8.1 |
| 7,781,935 B2* | 8/2010 | Jager et al. | | 310/309 |
| 7,847,421 B2* | 12/2010 | Gardner et al. | | 290/1 R |
| 7,851,932 B2* | 12/2010 | Rome et al. | | 290/10 |
| 7,981,056 B2* | 7/2011 | Briggs et al. | | 600/583 |
| 2002/0172060 A1* | 11/2002 | Takeuchi | | 363/110 |
| 2003/0083686 A1* | 5/2003 | Freeman et al. | | 606/181 |
| 2004/0178634 A1* | 9/2004 | Eskandr | | 290/1 R |
| 2004/0183306 A1* | 9/2004 | Rome | | 290/1 R |
| 2004/0222637 A1* | 11/2004 | Bednyak | | 290/1 R |
| 2004/0222638 A1* | 11/2004 | Bednyak | | 290/1 R |
| 2005/0035600 A1* | 2/2005 | Albsmeier et al. | | 290/1 E |
| 2006/0163876 A1* | 7/2006 | Eskandr | | 290/1 R |
| 2006/0192386 A1* | 8/2006 | Rome | | 290/1 R |
| 2007/0210580 A1* | 9/2007 | Roberts et al. | | 290/1 R |
| 2007/0276290 A1* | 11/2007 | Boecker et al. | | 600/583 |
| 2008/0074083 A1 | 3/2008 | Yarger et al. | | 320/137 |
| 2008/0164701 A1 | 7/2008 | Brown et al. | | 290/1 E |
| 2008/0164702 A1 | 7/2008 | Brown et al. | | 290/1 E |
| 2008/0174120 A1* | 7/2008 | Gardner et al. | | 290/1 |
| 2008/0217926 A1* | 9/2008 | Lemieux | | 290/1 R |
| 2009/0121493 A1* | 5/2009 | Lemieux | | 290/1 R |
| 2009/0121494 A1* | 5/2009 | Lemieux | | 290/1 R |
| 2009/0131829 A1* | 5/2009 | Freeman et al. | | 600/583 |
| 2009/0167034 A1* | 7/2009 | Waters et al. | | 290/1 R |
| 2009/0218824 A1* | 9/2009 | Freeland et al. | | 290/1 R |
| 2010/0187835 A1* | 7/2010 | Hohlfeld et al. | | 290/1 R |
| 2010/0194117 A1* | 8/2010 | Pabon et al. | | 290/1 R |
| 2010/0236440 A1* | 9/2010 | Rastegar | | 102/209 |
| 2010/0283264 A1* | 11/2010 | Rastegar et al. | | 290/1 R |
| 2010/0283265 A1* | 11/2010 | Rastegar et al. | | 290/1 R |
| 2011/0074162 A1* | 3/2011 | Cottone et al. | | 290/1 R |
| 2011/0109102 A1* | 5/2011 | McCoy et al. | | 290/1 R |

FOREIGN PATENT DOCUMENTS

| | | |
|---|---|---|
| WO | 2008/002412 A1 | 1/2008 |
| WO | 2008/002413 A2 | 1/2008 |
| WO | 2008/002414 A2 | 1/2008 |
| WO | 2008/036142 A1 | 3/2008 |
| WO | 2008/091274 A2 | 7/2008 |
| WO | 2008/091275 A2 | 7/2008 |

* cited by examiner

SYSTEM FOR GENERATING ELECTRICAL ENERGY FROM AMBIENT ENERGY

TECHNICAL FIELD

This disclosure relates generally to electrical generators. More specifically, this disclosure relates to a system to convert multiaxial ambient energy to electrical energy.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
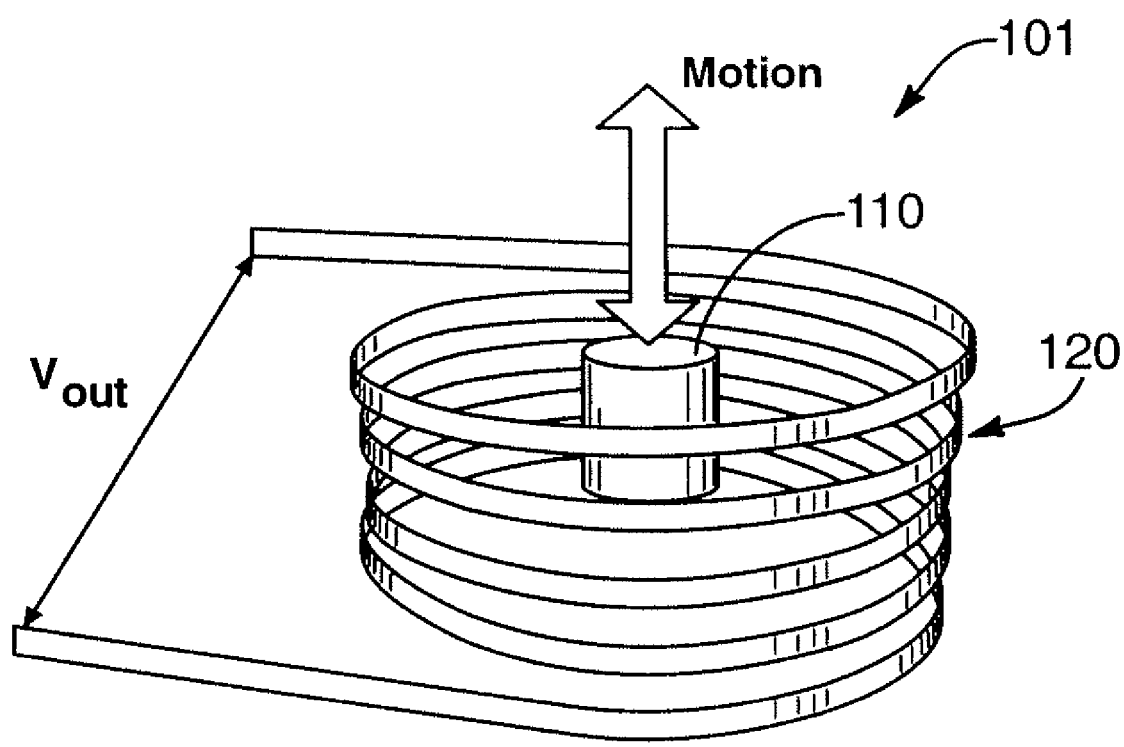
FIG. 1 is a perspective view of an embodiment of a linear motion electrical generator comprising a magnetic mass moving in a linear fashion relative to a coil.

A variety of portable electronic devices require electrical energy to operate. Cellular telephones, personal digital assistant (PDA) devices, portable music players, and toys are common devices requiring electrical energy. Often portable mechanical applications such as automobiles require electrical energy as well. Typically batteries are used to provide the electrical energy to power these portable devices, and the need to change or charge batteries does not limit the usefulness or effectiveness of the device.

Charging and changing batteries, however, is expensive and can be cumbersome. Moreover, many situations preclude or limit the ability to change or charge batteries, thus limiting the useful life of the device to the duration of the batteries. Military field operations, space exploration, wilderness camping, emergency situations involving power outage, intracorporeal medical devices, and animal tracking devices are such limiting situations where spare batteries are not readily available and charging batteries is difficult or impossible. Intracorporeal medical devices and animal tracking devices are further limiting in that the size and/or weight of the batteries must be minimized, and extensive precautions must be undertaken to prevent leakage and leaching of caustic or toxic compounds. Accordingly, increasing time between charging and/or changing batteries would be a desirable improvement.

The disclosed invention attempts to address these limitations by harvesting energy that is ambient to the device to generate electrical energy. The electrical energy that is generated can then be used to power the device and/or charge the batteries. Ambient energy generally includes any form of energy ambient to the device that can be transferred to the device, such as energy from physical motion, acoustic vibration, radiation, heat, pressure, and other forms of energy. As referred to herein, ambient energy includes any form of ambient energy that can be harvested to generate electrical energy, and more specifically includes energy resulting from ambient motion cause by physical movement of the device and energy from acoustic vibrations. The disclosure focuses on harvesting energy from ambient motion, but one of skill in the art will appreciate that the concepts are also applicable to ambient acoustic vibrations. The concepts are applicable to both harvesting energy of low frequency acoustic vibrations and generating electrical energy from high frequency acoustic vibrations.

Previous attempts to harvest ambient energy into electrical energy have largely failed to provide sufficient electrical energy to power anything but the smallest electronic devices. This is because ambient motions generally occur at lower frequencies, whereas efficient electrical energy generation occurs at higher frequencies. Some ambient motion may be 6 Hz, whereas others may be 60 Hz. Ocean waves have an even lower frequency in the range of 0.2 Hz to 0.5 Hz. By contrast, resonating-type electrical generators efficiently generate electricity at a higher frequencies. What is needed is a system capable of harvesting ambient energy at low frequencies and converting it to electrical energy.

The disclosure provides a system that can harvest energy from low frequency ambient motions and low frequency ambient vibrations and can then transfer the harvested energy to drive an electrical generator. According to one aspect of the present disclosure, a harvesting system can function as a mechanical force amplifier. The harvesting system amplifies the energy from lower frequency ambient motions by harvesting the energy over a longer time period and then imparting the harvested energy over a shorter time period to an electrical generator. The harvested energy can be transferred via a collision.

A force exerted over a period of time is referred to as an impulse. Ambient motion can be characterized as an impulse. For mathematical purposes, the variable "IMPULSE 1" can represent the impulse seen by a system for generating electrical energy from ambient motion due to an ambient motion. Similarly, a transfer of energy via a collision can be characterized as an impulse. As such, the variable "IMPULSE 2" can represent the impulse seen by a generator when energy harvested from ambient motion is transferred from the harvesting system via a collision. Based on Conservation of Momentum and the Impulse-Momentum Principle:

$$\text{IMPULSE 1} = \text{IMPULSE 2}, \tag{1}$$

IMPULSE 1 can be defined in terms of the force of the ambient motion, FORCE 1, and the frequency of the ambient motion, $\Delta t1$, by the equation:

$$\text{IMPULSE 1} = \text{FORCE 1} * \Delta t1. \tag{2}$$

Similarly, IMPULSE 2 can be defined in terms of the force of the transferred impulse, FORCE 2, over the period of time of the transferred impulse, $\Delta t2$, by the equation:

$$\text{IMPULSE 2} = \text{FORCE 2} * \Delta t2. \tag{3}$$

Rewriting equation (1) in terms of force and frequency results in the equation:

$$\text{FORCE 1} * \Delta t1 = \text{FORCE 2} * \Delta t2. \tag{4}$$

Equation (4) can be solved for FORCE 2 to generate the equation:

$$\text{FORCE 2} = \text{FORCE 1} * (\Delta t1)/(\Delta t2). \tag{5}$$

As required by equation (5), in all cases where $\Delta t2$ is less than $\Delta t1$, FORCE 2 will be greater than FORCE 1. Moreover, since force=mass*acceleration, a corollary is that ACCELERATION 2 must be greater than ACCELERATION 1.

A familiar example of the foregoing principles and the results of impulsively transferring energy is a tuning fork. If a tuning fork is swung back and forth in the air without striking a hard surface, very little noise is generated by the tuning fork meaning that there is little to no vibration occurring in the fork. By comparison, if the tuning fork is swung at the same velocity but strikes a hard surface, then a significant noise is produced by the tuning fork because a higher frequency vibration results from the impact. The impact between the tuning fork and the hard surface causes the energy of the swinging tuning fork to be transferred into higher frequency vibrating oscillations.

Based on the foregoing principles, the energy harvesting systems disclosed herein can function as acceleration amplifiers by collecting energy over a longer time period and transferring it out over a shorter time period. In one embodiment, the harvested energy can be impulsively transferred to drive a resonant electrical generator by generating high frequency oscillations that efficiently generate electrical energy. In another embodiment, the harvested energy can be impulsively transferred to drive other types of vibration-driven electrical generators such as a Coulomb-force parametric generator.

Also disclosed herein is a system that can harvest energy at a plurality of frequencies and convert it to electrical energy. For example, one or more resonating-type electrical generators can be tuned to a resonant frequency that effectively and efficiently generates electrical energy. One or more other stages harvest kinetic energy from ambient motion at one or more lower frequencies and store the energy as potential energy. The stored potential energy can be periodically released to the one or more resonating electrical generators to create a resonant oscillation of the generators, thereby increasing the amount of electrical energy that may be produced from ambient energy.

The embodiments of the disclosure will be best understood by reference to the drawings, wherein like elements are designated by like numerals throughout. In the following description, numerous specific details are provided for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

FIG. 1 is a perspective view of an embodiment of a linear resonating electrical generator 101 comprising a magnet 110 moving in a linear fashion relative to a coil 120. The magnet 110 generates a magnetic field and the coil 120 is within the magnetic field. The magnet 110 may be configured to move in a linear fashion as indicated by the arrows. The movement of the magnetic field with respect to the coil 120 generates a current in the coil 120. The current creates a voltage Vout across two ends of the coil 120. Movement of the magnet 110 may be caused in numerous ways. As an example, the magnet 110 may be suspended by a spring and ambient energy may result in an oscillation of the magnet 110. In another embodiment, the magnet 110 and coil 120 may be disposed within a housing. The magnet 110 may be configured to freely move back and forth within the coil 120 in response to a user shaking the housing. In another embodiment, the magnet 110 may be fixed while the coil 120 freely moves in the housing with respect to the coil 120.

The embodiment of FIG. 1 may be configured to allow multiaxial movement of the magnet 110 with respect to the coil 120. However, there may not be current generation by movement in all directions. Supposing that the arrows in FIG. 1 correspond with a direction along an axis y, movement along an axis x or an axis z may produce little or no current. The embodiment also may have a single resonant frequency and would rely on ambient motions along the y axis at or near that resonant frequency to generate electrical energy. In most cases the ambient motions may not occur at a high enough frequency to efficiently generate electrical energy.

Figure 2:
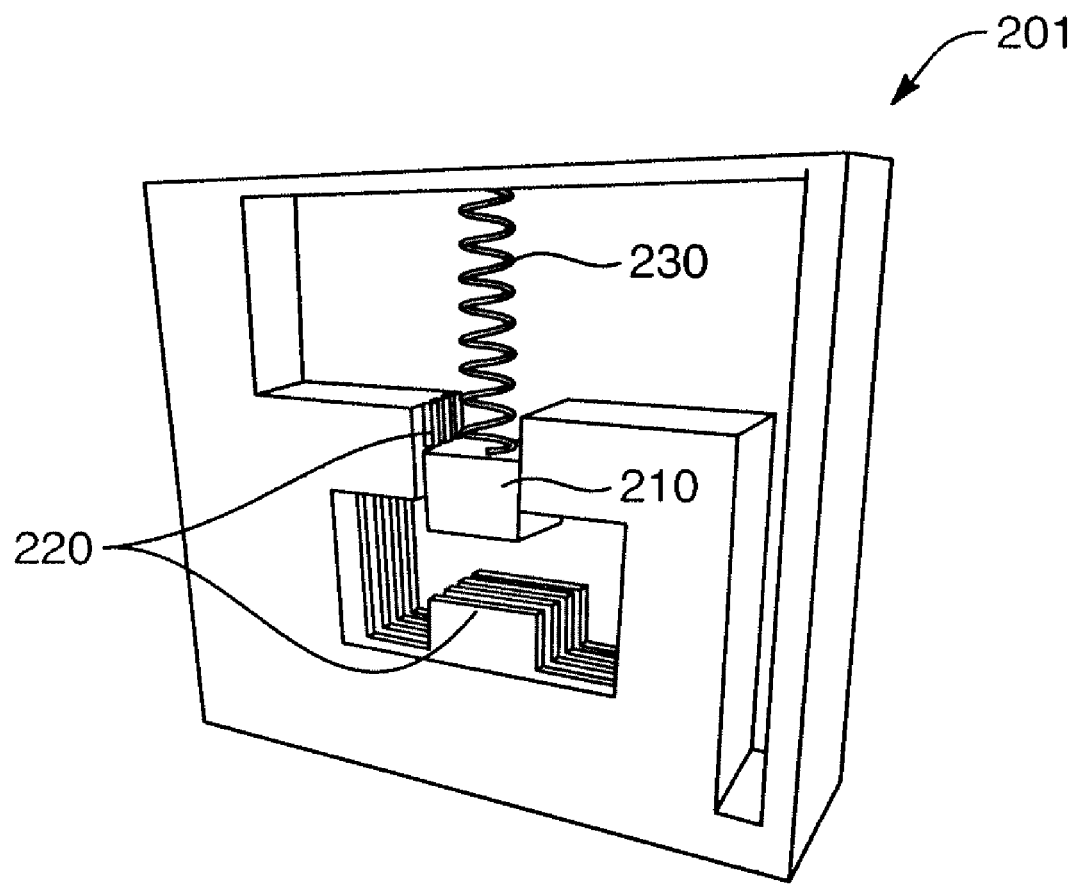
FIG. 2 is a perspective view of one embodiment of a multiaxial motion electrical generator.

FIG. 2 is a perspective view of one embodiment of a multiaxial resonating electric energy generator 201 comprising a magnet 210 suspended by a biasing element 230, wherein the magnet 210 is disposed proximate to a coil 220. The biasing element 230 may be a spring, as depicted in FIG. 2. In another embodiment, the biasing element 230 may be a flexible membrane. In still another embodiment, the biasing element 230 may comprise a cantilever beam. As with FIG. 1, the embodiment depicted in FIG. 2 has a single resonant frequency, and must rely on ambient movements at or near that resonant frequency to efficiently generate electrical energy. The biasing element 230 may be configured and tuned so that the resonant oscillation corresponds to common ambient movement, thereby increasing the likelihood that a common ambient movement of the multiaxial motion electric generator may translate into oscillation of the biasing element 230. As before, movement of the magnet 210 with respect to the coil 220 produces an electric current in the coil 220.

As depicted, the embodiment in FIG. 2 may be configured to allow multiaxial movement of the magnet 210. Suppose that movement in a direction in line with the spring biasing element 230 corresponds with an axis y. Such movement may result in the spring biasing element 230 compressing and decompressing and causing the magnet 210 to oscillate in a bouncing or linear fashion. There may also be movement along an axis x and an axis z. For example, the oscillation of the magnet 210 may be similar to a swinging action of a pendulum such that the spring biasing element 230 causes the magnet 210 to swing in an arc. As depicted, movement along the x axis may be limited or eliminated entirely. The coil 220 may be sensitive to any movement of the magnet that is at right angles to any of windings of the coil 220. Movement along the x axis may be constrained, but similar in sensitivity to motions along the y and z axes.

The embodiments of FIGS. 1 and 2 may have a single resonant frequency at which electrical energy may be generated effectively. Efficient electrical energy generation generally occurs at high frequencies. However, ambient motion generally occurs at low frequencies. The variance between the frequency of ambient movement and the frequency for efficient electrical energy generation renders this embodiment less than ideal. The challenge can be overcome by harvesting energy from low frequency ambient energy and then using that energy to drive a high frequency oscillation capable of efficiently generating electrical energy.

Figure 3:
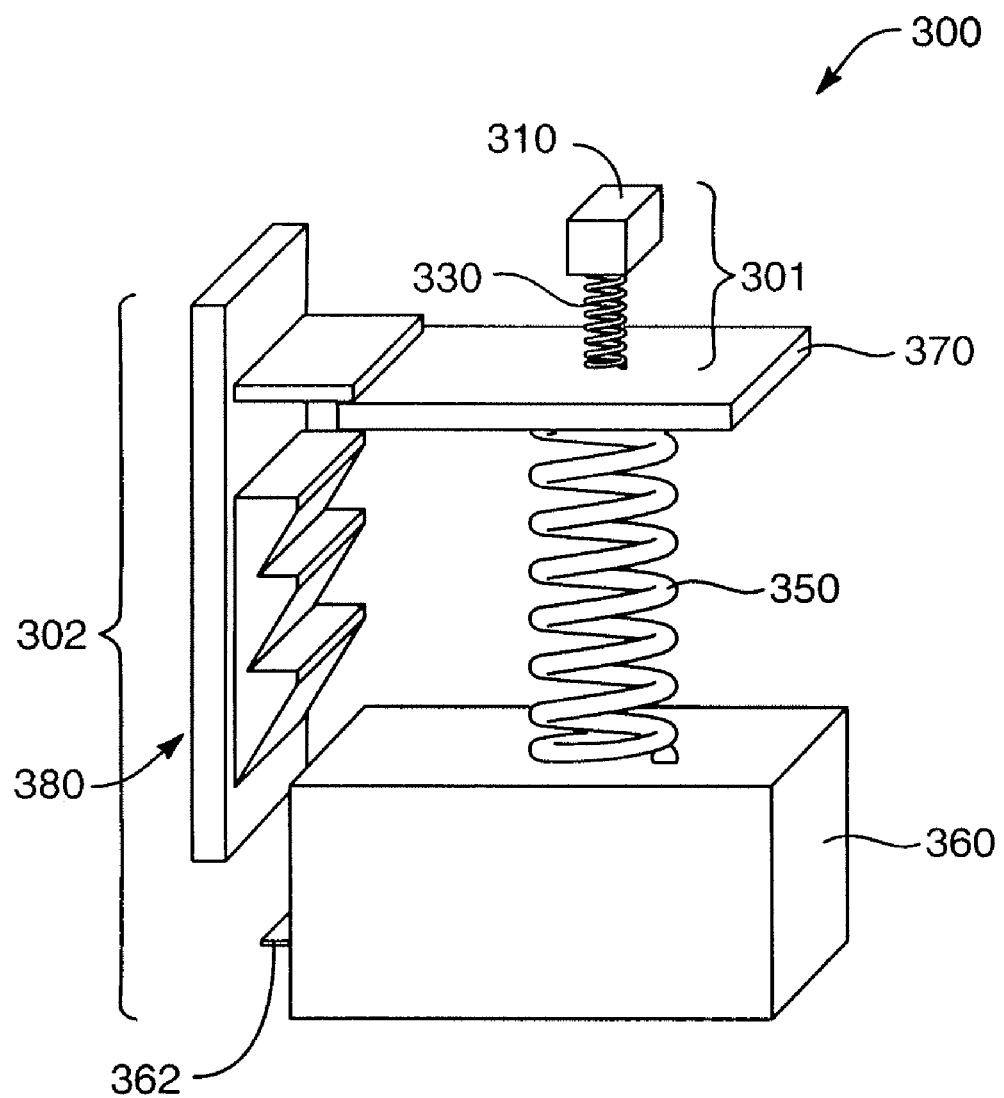
FIG. 3 is a perspective view of one embodiment of a system for generating electrical energy from multiaxial ambient energy.

FIG. 3 is a perspective view of one embodiment of a system 300 for generating electrical energy from multiaxial ambient energy. The embodiment is capable of using the energy from low frequency ambient energy to drive a high frequency oscillation for effective electrical energy generation. The embodiment may comprise a resonating electrical generator 301 and a kinetic energy conversion system 302. The resonating electrical generator 301 may be considered a primary stage, or part of a primary stage, and the kinetic energy conversion system 302 may be considered a supplementary stage, or part of a supplementary stage. The primary stage may be capable of producing electricity in response to motion, independent of the supplementary stage. The supplementary stage may be configured to store energy and periodically release the stored energy to the primary stage to increase generation of electrical energy.

Although in a simplistic form, the embodiment shown in FIG. 3 depicts basic components of one embodiment of the disclosure. The resonating electrical generator 301 may comprise a biasing element 330 and a magnet 310. The biasing element 330 may be tuned such that the magnet 310 oscillates at a specific resonant frequency. The resonant frequency can correspond to typical, common ambient movements. The resonant frequency may be may be in the range that efficiently produces electrical energy. The magnet 310 is in proximity to a coil (not depicted) such that the oscillation of the magnet 310 relative to the coil generates a current within the coil.

The kinetic energy conversion system 302 may be coupled to the resonating electrical generator 301 to convert kinetic energy and store it as potential energy that can be periodically released. The released stored potential energy may be used to generate a resonant oscillation to supplement ongoing multiaxial ambient motion to drive the generator 301. The kinetic energy conversion system 302 may comprise a driving mass 360, a ratcheting mechanism 380, and a biasing element 350 to store potential energy. The driving mass 360 may be configured to move in response to ambient energy. The movement may be actual movement of the driving mass 360 in response to ambient energy. The movement may also be relative, such as a relative shift due to inertia of the driving mass 360. The driving mass 360 may remain stationary as the rest of the kinetic energy conversion system shifts. In other words, the movement may not be actual movement, but rather movement relative to the biasing element 350 in response to ambient energy. Movement of the driving mass 360 may convert kinetic energy to stored potential energy by loading the biasing element 350. Loading the biasing element 350 may mean displacing the biasing element 350 from a resting position to a strained position and holding it in a strained position, thereby loading it with stored potential energy.

The ratcheting mechanism 380 may facilitate loading the biasing element 350. The ratcheting mechanism 380 may prevent the driving mass 360 from shifting back in response to the biasing element 350 moving in the direction of its resting position. Consequently, the ratcheting mechanism 380 and the driving mass 360 hold the biasing element 350 in a strained position, thus storing potential energy. The biasing element 350 may be tuned to have a resonant frequency that is different from the resonant frequency of the biasing element 330 of the resonating electrical generator 301. By tuning the biasing element 350 to a different resonant frequency, the range of frequencies of ambient movement from which electrical energy can be harvested is increased. The energy of low frequency ambient movement can be harvested to be used to drive the resonating electrical generator 301. At the same time, higher frequency ambient movement can drive the resonating electrical generator 301 directly.

In another embodiment, the ratcheting mechanism 380 may hold the biasing element 350 in a strained position without engaging the driving mass 360. For example, a locked platform 370 may be moved along in one direction by the driving mass 360. The ratcheting mechanism 380 may prevent the locked platform 370 from reversing direction, thereby holding the biasing element 350 in a strained position. (See FIGS. 6A-6C).

Figure 4A:
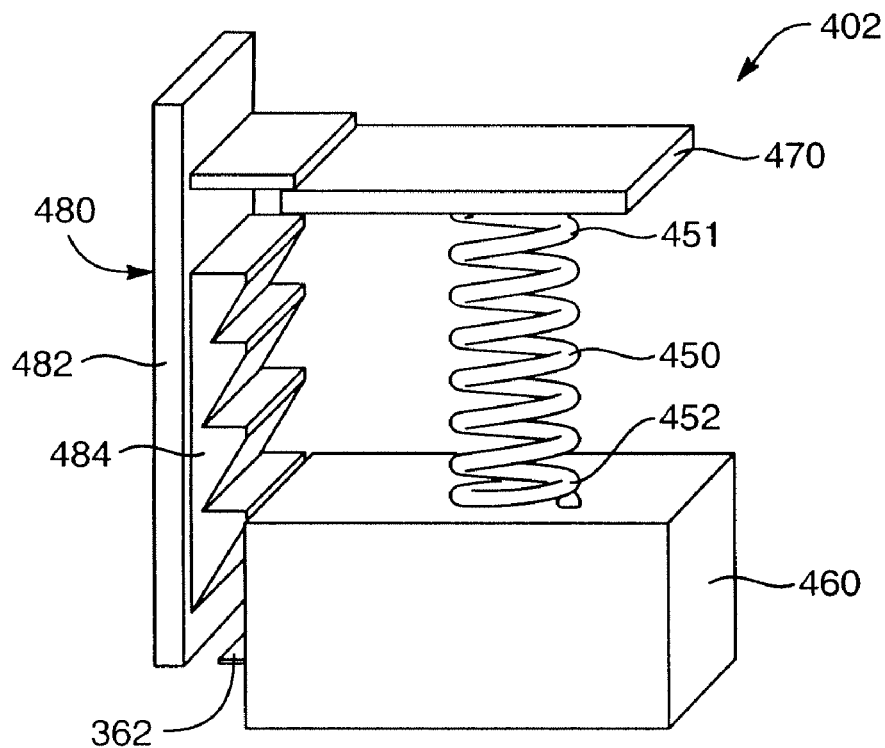
FIG. 4A is a perspective view of an embodiment of a kinetic energy conversion system.
Figure 4B:
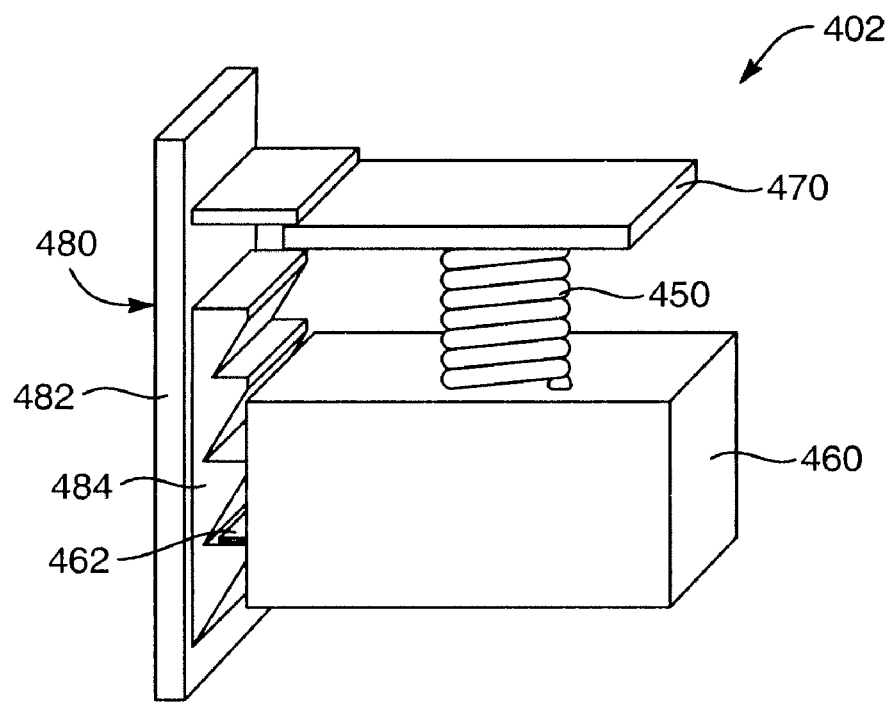
FIG. 4B is another perspective view of the kinetic energy conversion system of FIG. 4A.

FIGS. 4A and 4B are perspective views of one embodiment of a kinetic energy conversion system 402 by itself, without the resonating electrical generator 301 depicted in FIG. 3. In one embodiment, the biasing element 450 may be a spring, as depicted in FIGS. 4A and 4B. The spring biasing element 450 may be displaced from a resting position to a strained position by a driving mass 460 either compressing or stretching the spring biasing element 450. In another embodiment, the biasing element 450 may be formed of resilient material. In another embodiment, the biasing element 450 may be one of a torsion shaft or a coil spring that stores potential energy upon winding or twisting.

A locked platform 470 may secure the biasing element 450 to enable loading the biasing element 450, displacing it from a resting position to a strained position. As depicted in FIGS. 4A and 4B, the spring biasing element 450 may comprise a fixed end 451 and a free end 452. The driving mass 460 may be coupled to the free end 452 of the spring biasing element 450. The locked platform 470 may secure the fixed end 451 such that the driving mass 460 either compresses or stretches the spring biasing element 450 by pushing or pulling the free end, respectively. The locked platform 470 may be configured to periodically release and thereby release any stored potential energy in the biasing element 450.

The kinetic energy conversion system 402 may further comprise a ratcheting mechanism 480 that may be configured to engage the driving mass 460. The ratcheting mechanism 480 may comprise a ratchet face 482 with teeth 484 to engage the driving mass 460. The teeth 484 may be configured to allow the driving mass 460 to shift in one direction while preventing it from shifting back in the opposite direction. Suppose the driving mass 460 moves along an axis y to compress or stretch the spring biasing element 450. The teeth 484 of the ratcheting mechanism 480 may allow the driving mass 460 to move up the y axis, and prevent the driving mass 460 from moving back down the y axis. The driving mass 460 may be free to move along an axis x or along an axis z, but energy is only harvested from movement along the y axis. In another embodiment, a housing (not shown) may prevent movement of the driving mass 460 along the x axis or the z axis. In yet another embodiment, multiple kinetic energy conversion systems 402 may be incorporated and configured to harvest energy from movement in a plurality of directions.

The driving mass 460 may further comprise a flange 462 to engage the teeth 484 of the ratcheting mechanism 480. The flange 462 may protrude near the teeth 484 of the ratcheting mechanism 480 and thereby enable the teeth 484 to better engage the driving mass 460.

FIG. 4B depicts a compressed spring biasing element 450 after the driving mass 460 has shifted in response to ambient movement. The teeth 484 of the biasing element are shown engaged with the flange 462 and prevent the driving mass 460 from reversing direction, thereby holding the biasing element 450 in a strained position storing potential energy. The embodiment may further comprise a release mechanism (not shown) that may release the ratcheting mechanism 480 allowing the biasing element 450 to release the stored potential energy. The release mechanism may release the locked platform 470, or may release the flange 462 of the driving mass 460. The released energy may be used to create a resonant oscillation of the first stage, or a resonant oscillation of the resonant electrical generator 301 (as depicted in FIG. 3) to increase generation of electrical energy.

Figure 5A:
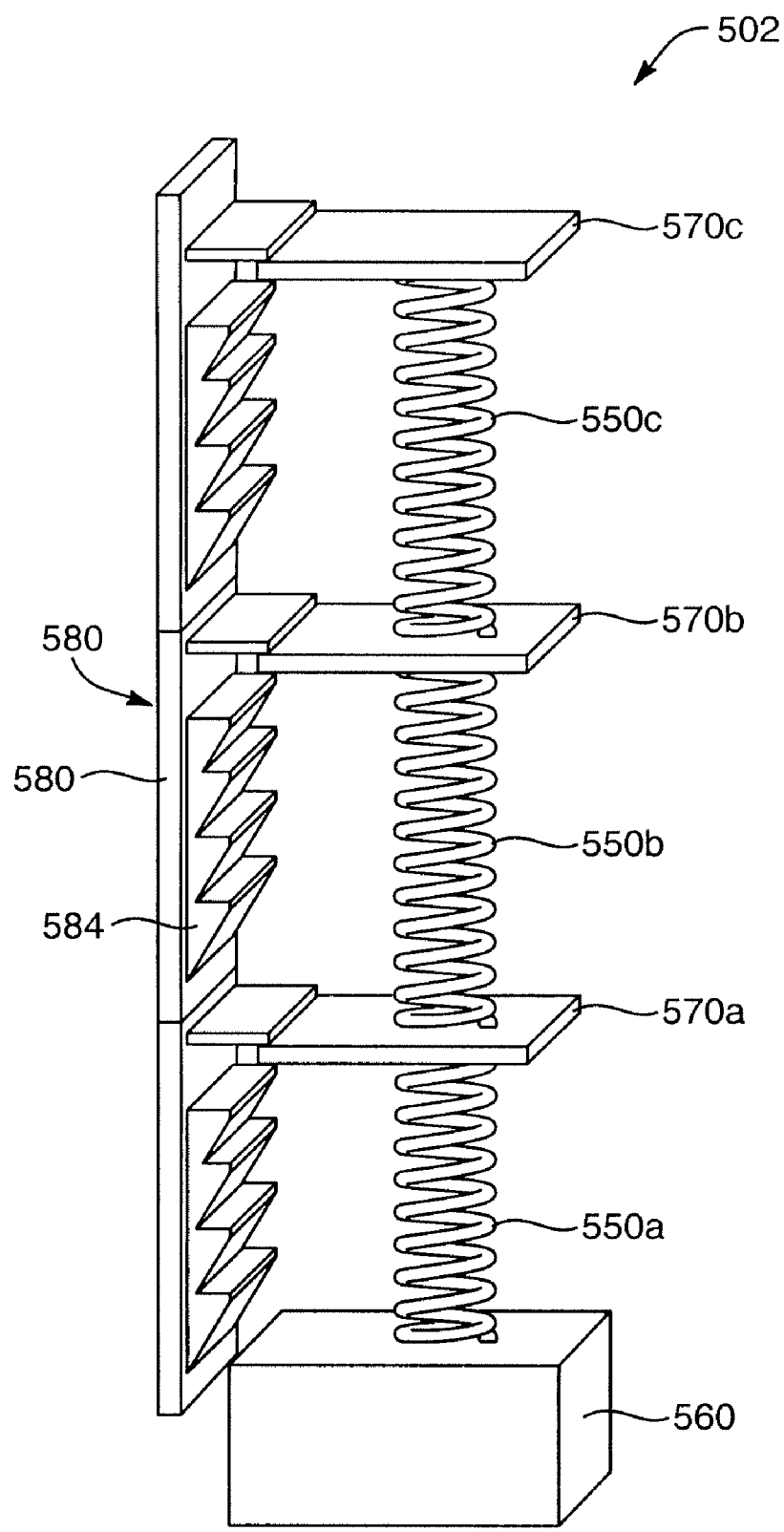
FIG. 5A is a perspective view of another embodiment of a kinetic energy conversion system.
Figure 5B:
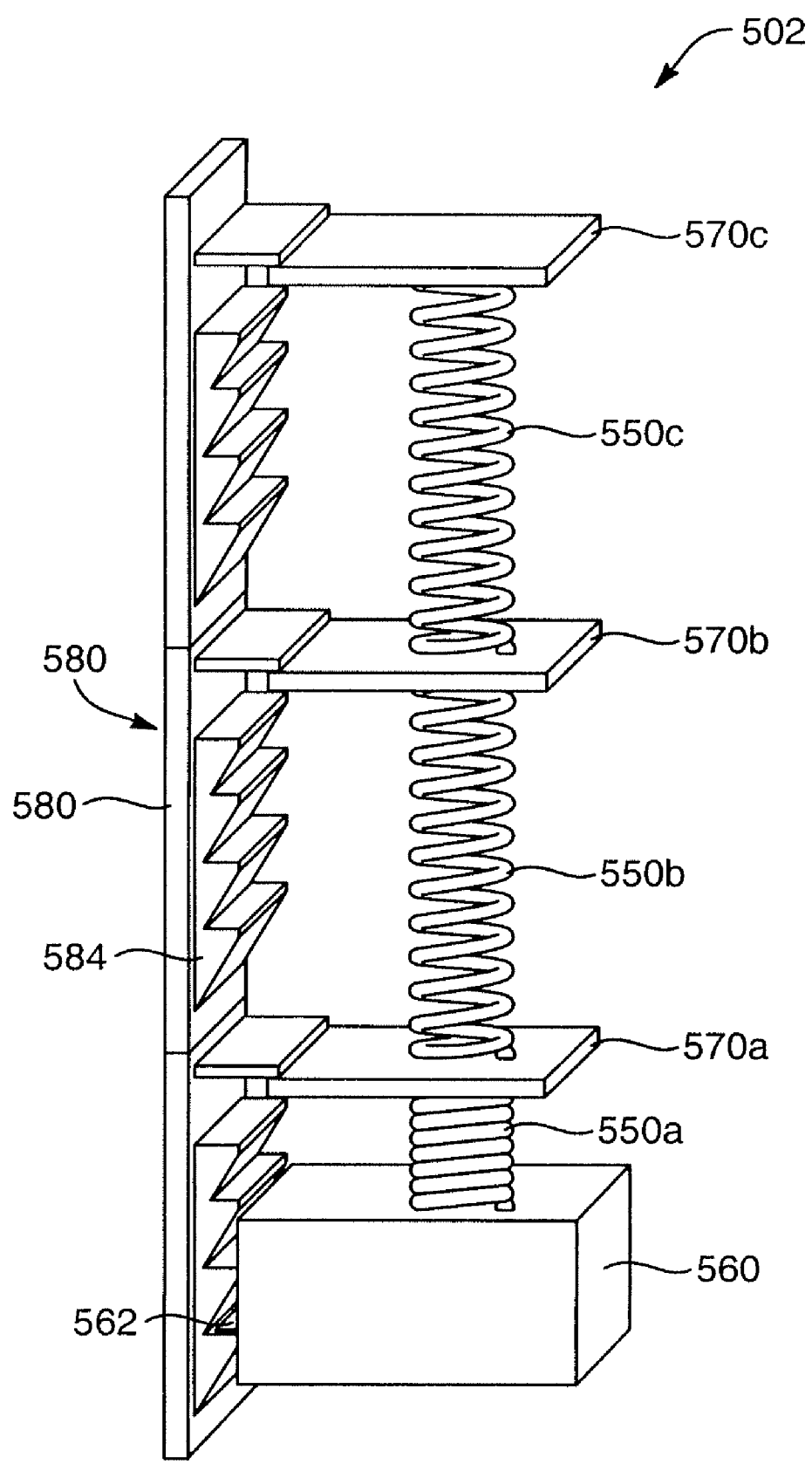
FIG. 5B is a perspective view of another embodiment of a kinetic energy conversion system.
Figure 5C:
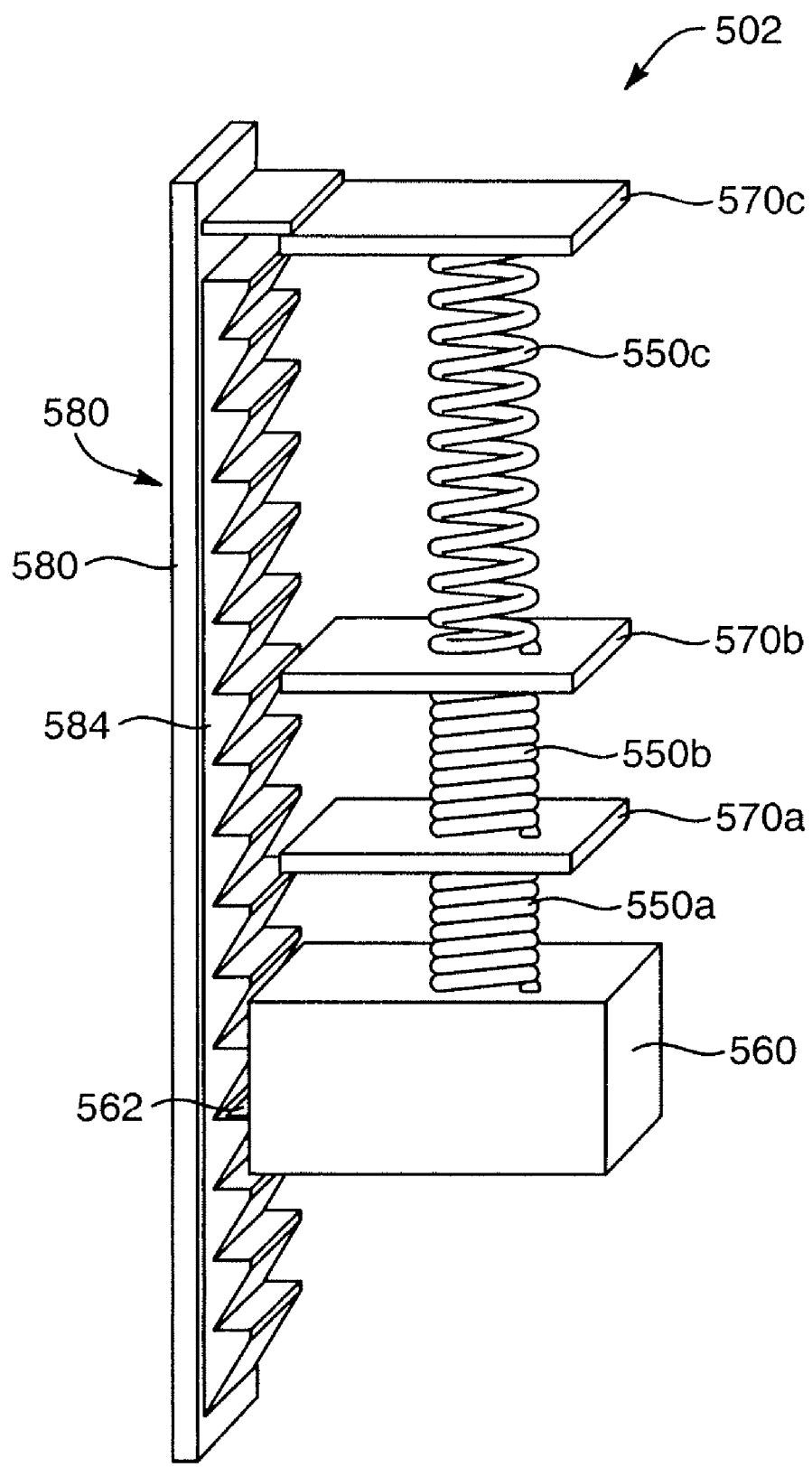
FIG. 5C is a perspective view of another embodiment of a kinetic energy conversion system.

FIGS. 5A, 5B, and 5C are perspective views of another embodiment of a kinetic energy conversion system 502 having a plurality of biasing elements 550. As shown, the biasing elements 550 may be springs. The spring biasing elements 550 may be sequentially displaced from a resting position to a strained position by a driving mass 560 that compresses or stretches each. In another embodiment, one or more of the plurality biasing elements 550 may be formed of a resilient material. In another embodiment, the biasing elements 550 may be one of a torsion shaft, a torsion spring, or a coil spring that stores potential energy upon winding or twisting.

The embodiment may further comprise a ratcheting mechanism 580 to allow the driving mass 560 to move in one direction while preventing it from moving back the opposite direction. The ratcheting mechanism 580 may comprise a ratchet face 582 supporting teeth 584. As explained above, the driving mass 560 may move along an axis y to compress or stretch the biasing elements 550. The teeth 584 of the ratcheting mechanism 580 may allow the driving mass 560 to move up the y axis and prevent the driving mass 560 from moving back down the y axis. The driving mass 560 may be free to move along an axis x or along an axis z, but energy is only harvested from movement along the y axis. In another embodiment, a housing (not shown) may prevent movement of the driving mass along the x axis or the z axis.

A plurality of locked platforms 570 may secure one end of the corresponding biasing elements 550 to enable displacing each from a resting position to a position of strain. The plurality of locked platforms 570 may be configured to enable sequential loading of each biasing element 550. Similar to the embodiment depicted in FIGS. 4A and 4B, the spring biasing elements 550 may comprise a fixed end and a free end. The driving mass 560 may be coupled to the free end of a first spring biasing element 550a. A first locked platform 570a may secure the fixed end of the first biasing element 550a in a manner such that the driving mass 560 either compresses or stretches the first biasing element 550a by pushing or pulling the free end, respectively.

In another embodiment, the kinetic energy conversion system 502 may further comprise a ratcheting mechanism 580 that may be configured to allow the driving mass 560 to drive the locked platforms 570 along the teeth 584, yet the teeth 584 may never engage the driving mass 560.

FIG. 5B depicts the embodiment of the kinetic energy conversion system 502 of FIG. 5A with the first biasing element 550a compressed. The flange 562 of the driving mass 560 is engaged with the teeth 584 of the ratcheting face 582, whereby the ratcheting mechanism 580 prevents the driving mass from moving in a direction opposite the direction moved to compress the first biasing element 550a, thereby holding the first biasing element 550a in a strained position storing potential energy.

Once the first biasing element 550a is loaded, the first locked platform 570a may be configured to enable sequential loading of a second biasing element 550b by maintaining the first biasing element 550a in the strained position while the driving mass 560 either compresses or stretches the second biasing element 550b. In one embodiment, the first locked platform 570a may couple to the driving mass and unlock. Thus, the first locked platform 570a, the loaded first biasing element 550a, and the driving mass 560 may be coupled as a single moving part that can move the second biasing element 550b to a strained position, loading it with potential energy.

A second locked platform 570b may secure the fixed end of the second biasing element 550b in a manner such that the driving mass either compresses or stretches the second biasing element 550b by pushing or pulling the free end of the second biasing element 550b, respectively. The first locked platform 570a may facilitate sequential loading of the second biasing element 550b by coupling to the driving mass 560 once a level of displacement of the first biasing element 550a has been achieved. In this manner, the first loaded biasing element 550a and the driving mass 560 may be coupled together as a single moving piece to then displace the second biasing element 550b.

FIG. 5C depicts the embodiment of the kinetic energy conversion system 502 of FIGS. 5A and 5B with the first biasing element 550a and the second biasing element 550b compressed. The flange 562 of the driving mass 560 is engaged with the teeth 584 of the ratcheting face 582, whereby the ratcheting mechanism 580 prevents the driving mass from moving in a direction opposite the direction moved to compress the first biasing element 550a and the second biasing element 550b, thereby holding the first biasing element 550a and the second biasing element 550b in a strained position storing potential energy.

A third biasing element 550c may be sequentially loaded similar to loading of the second biasing element 550b. The second locked platform 570b may engage the first locked platform 570a and the driving mass 560, once a level of displacement of the second biasing element 550b has been achieved. Any number of biasing elements may be sequentially loaded in this manner.

When all of the biasing elements 550 have been loaded, the kinetic energy conversion system 502 may release the stored potential energy. The kinetic energy conversion system 502 may further comprise a release mechanism (not shown). The locked platforms 570 may be configured to unlock simultaneously to allow the biasing elements 550 to simultaneously release the respective stored potential energy in each. The release mechanism may also disengage the driving mass 560 from the ratcheting mechanism 580 to allow it to return to its original position to repeat the process of loading the biasing elements 550.

In another embodiment, the release mechanism may simultaneously release the locked platforms 570 and the driving mass 560, thereby allowing the biasing elements 550 to release the stored potential energy. The driving mass 560 may be forced back toward the position where it started the loading process and contact the first stage, or the resonant electrical generator, to generate a resonant oscillation of the first stage, or the resonant electrical generator.

Figure 5D:
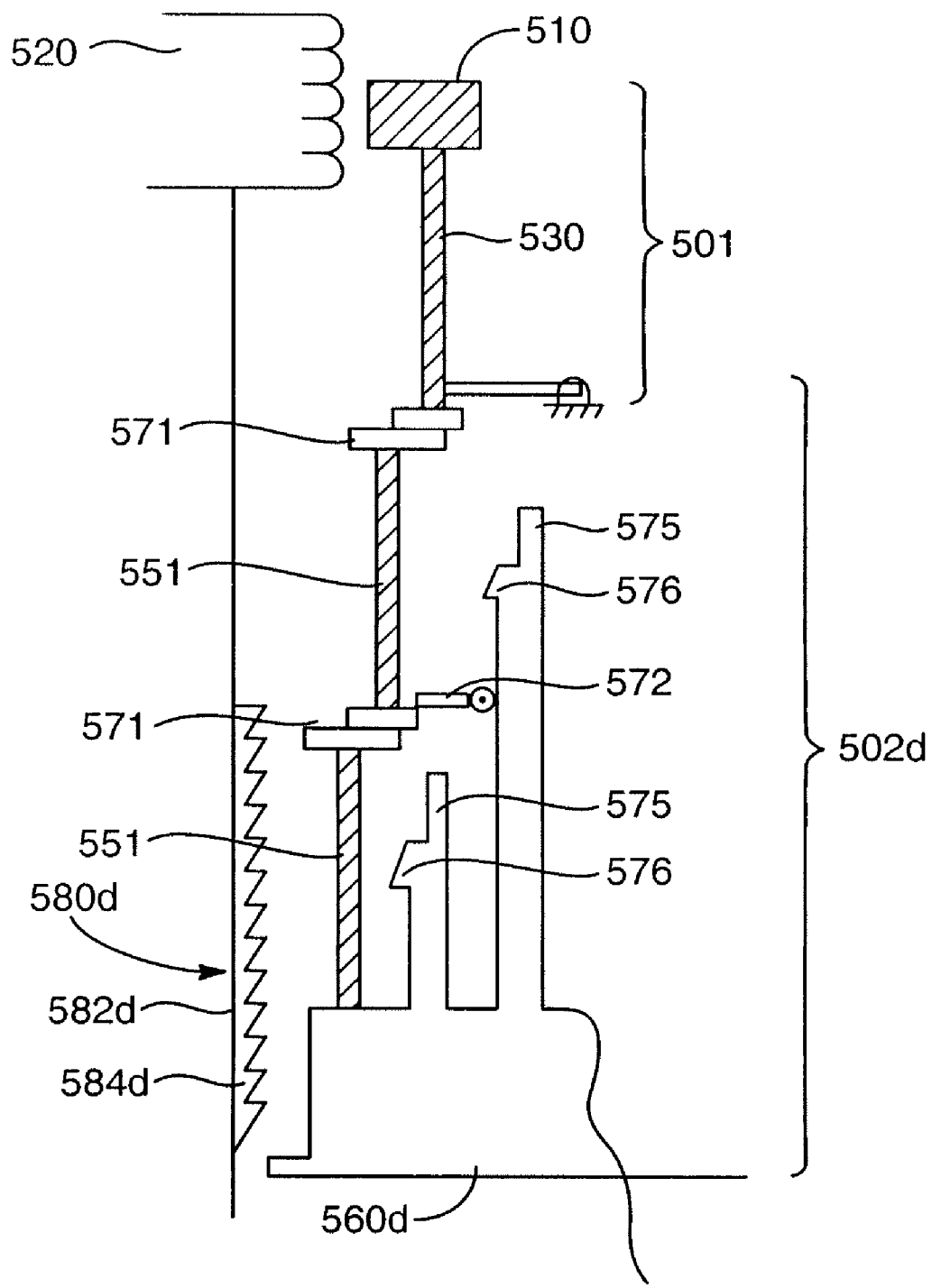
FIG. 5D is a side elevation view of one embodiment of a system for generating electrical energy from ambient energy.

FIG. 5D is a side elevation view of one embodiment of a system 500 for generating electrical energy from ambient energy. The embodiment 500 may comprise a first stage 501 comprising a multiaxial resonating electrical generator and second stage 502d comprising a kinetic energy conversion system.

The kinetic energy conversion system 502d may be similar to previously mentioned embodiments, such as the embodiment depicted in FIGS. 5A-5C. The embodiment comprises a ratcheting mechanism 580d to allow a driving mass 560d to move in one direction while preventing it from moving back the opposite direction. The ratcheting mechanism 580d may comprise a ratchet face 582d supporting teeth 584d. The teeth 584d of the ratcheting mechanism 580d may allow the driving mass 560d to move up the y axis, and prevent the driving mass 560 from moving back down the y axis.

The embodiment of FIG. 5D may further comprise a plurality of fixed pivot arms 572 to engage and secure the corresponding locked platforms 571. The driving mass 560d may further comprise fingers 575 to release a corresponding fixed pivot arm 572. The fingers 575 may further comprise a finger lock 576 to engage the corresponding locked platform 571 when the corresponding biasing element 551 is fully loaded. The finger locks 576 may hold loaded biasing elements 551 in a loaded position while subsequent biasing elements 551 are loaded. Once a first biasing element 551 is fully loaded, the driving mass 560d may sequentially load a second biasing element 551. Any number of biasing elements 551 may be loaded sequentially in this manner. After all the biasing elements 551 are fully loaded, all the finger locks 576 simultaneously release to allow the biasing elements 551 to release stored potential energy. The released energy generates a resonant oscillation of the resonating electrical generator 501.

The resonating electrical generator 501 may comprise a magnet 510 coupled to a biasing element 530. As depicted in FIG. 5D, the biasing element 530 may comprise a spring. The magnet 510 generates a magnetic field. The magnet 510 is disposed proximate to a coil 520 such that the coil is within the magnetic field. The resonant oscillation generated by the kinetic energy conversion system 502d releasing stored energy causes the magnet 510 to oscillate relative to the coil 520 and thereby cause the magnetic field to move relative to the coil 520. The movement of the magnetic field relative to the coil 520 generates an electrical current within the coil.

Figure 6A:
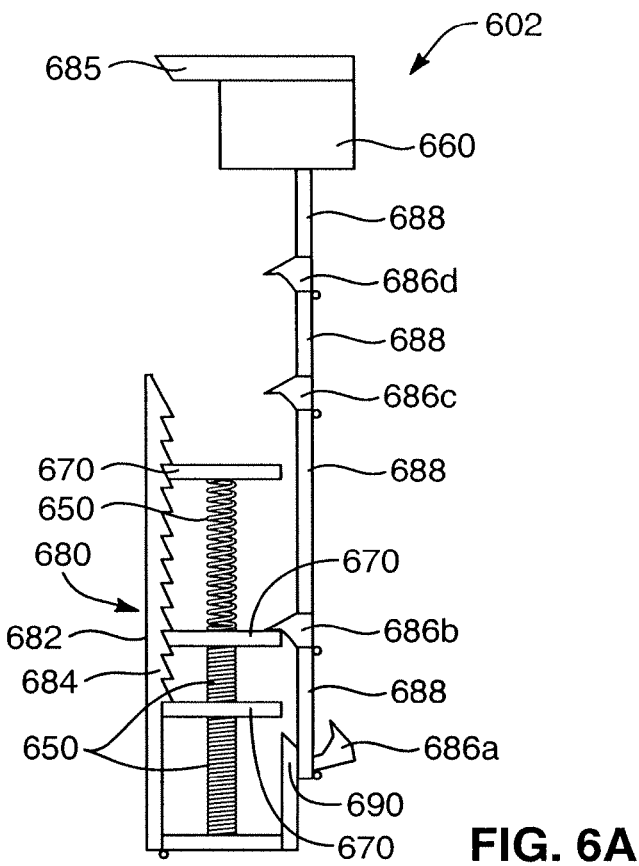
FIG. 6A is a side elevation view of another embodiment of a kinetic energy conversion system.
Figure 6B:
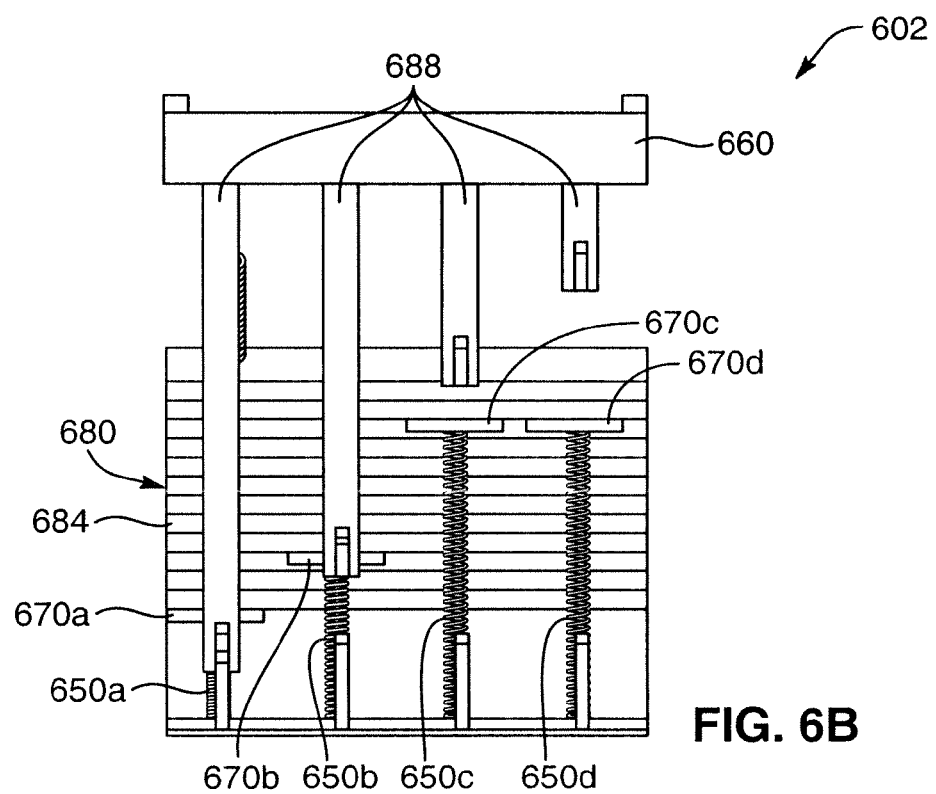
FIG. 6B is a front elevation view of the embodiment of a kinetic energy conversion system of FIG. 6A.
Figure 6C:
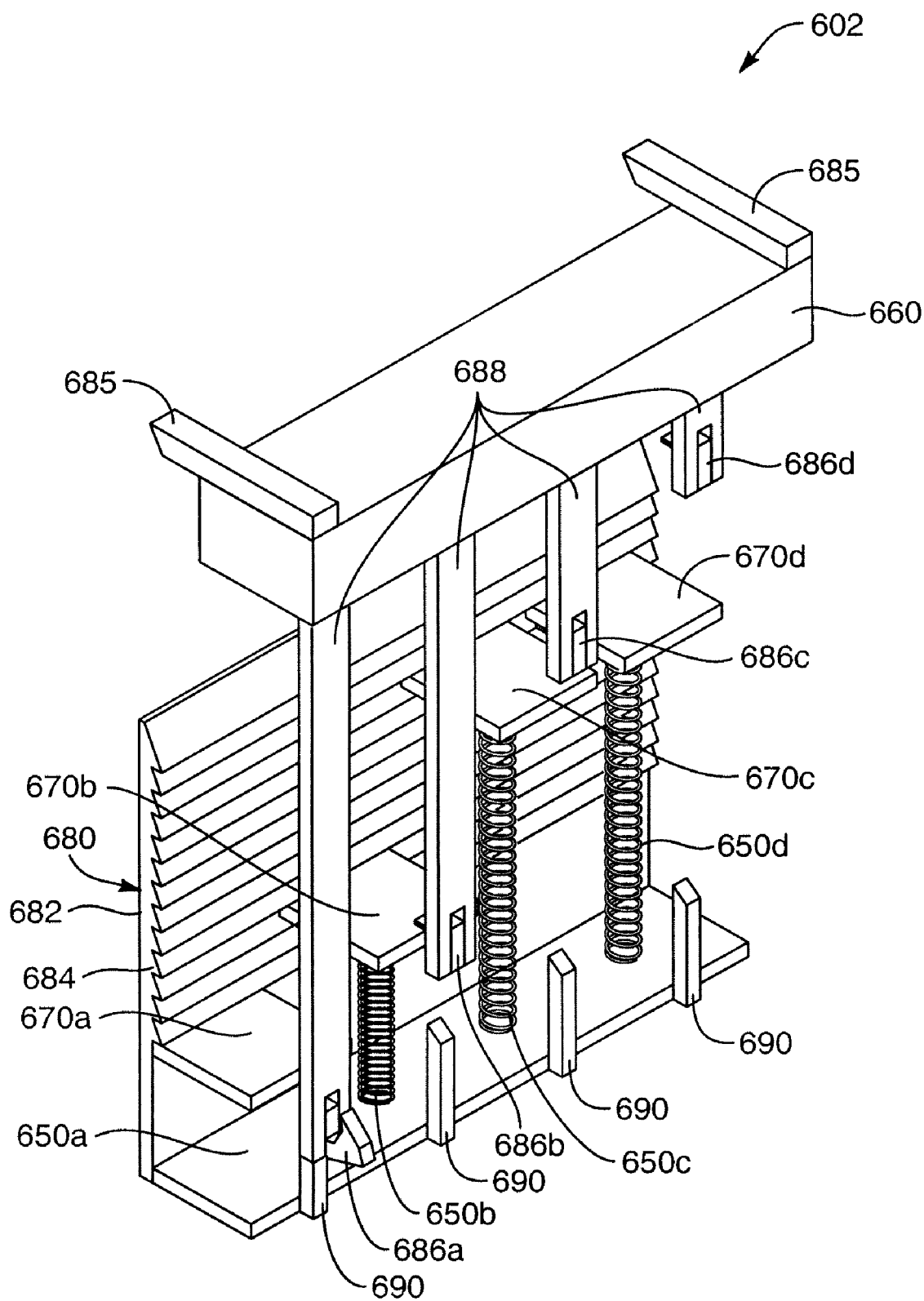
FIG. 6C is a perspective view of the embodiment of a kinetic energy conversion system of FIG. 6A.

FIGS. 6A-6C depict another embodiment of a kinetic energy conversion system 602 having a plurality of biasing elements 650, in parallel, to store kinetic energy converted to potential energy. FIG. 6A is a side elevation view of the embodiment. FIG. 6B is a front elevation view of the same embodiment. FIG. 6C is a perspective view of the same embodiment. As shown in FIGS. 6A-6C, the biasing elements 650 may be springs. The spring biasing elements 650 may be sequentially displaced from a resting position to a strained position by a driving mass 660 that compresses or stretches each. In another embodiment, one or more of the plurality of biasing elements 650 may be formed of a resilient material. In another embodiment, the biasing elements 650 may be one of a torsion shaft, a torsion spring, or a coil spring that stores potential energy upon winding or twisting.

The driving mass 660 may move along an axis y to compress or stretch the biasing elements 650. The driving mass 660 may be free to move in either direction along the y axis, exerting force on the biasing elements on, for example, the down stroke. The driving mass 660 may also be free to move along an axis x or along an axis z, but energy may be harvested only from movement along the y axis. In another embodiment, a housing (not shown) may prevent movement of the driving mass along the x axis or the z axis. In still another embodiment, a plurality of driving masses (not shown) may be configured to harvest energy from movement in a plurality of directions, translating that energy to a force that may displace the biasing elements 650 and thereby store potential energy.

A plurality of locked platforms 670 may be coupled to one end of the corresponding biasing elements 650 to enable displacing the biasing elements from a resting position to a strained position. A second end of the biasing elements 650 may be fixed. The plurality of locked platforms 670 may be configured to enable sequential loading of each of the biasing elements 650.

The kinetic energy conversion system 602 may further comprise a ratcheting mechanism 680 that may be configured to enable the driving mass 660 to drive the locked platforms 670 and thereby exert force on the biasing elements 650. The ratcheting mechanism may couple to the locked platforms and the driving mass, whereby the driving mass exerts a force through the ratcheting mechanism 680 to the locked platforms 670, and on to the biasing elements 650.

The ratcheting mechanism may comprise a ratchet face 682 that supports teeth 684. The ratcheting face 682 and teeth 684 may be integrally formed to comprise a single component. The teeth 684 of the ratcheting mechanism 680 may allow the locked platforms to move in one direction along an axis y, and prevent the locked platforms from moving in an opposite direction along the y axis.

The ratcheting mechanism may further comprise a plurality of driving pawls 686 configured to engage a corresponding locked platform 670. A plurality of linked arms 688 may be coupled to corresponding driving pawls 686 and coupled to the driving mass 660. The linked arms 688 may be configured to sequentially load the plurality of biasing elements 650. For example, as depicted in FIGS. 6B and 6C, the linked arms 688 may be of differing lengths such that the corresponding driving pawls 686 engage the plurality of locked platforms 670 one at a time. A disengaging mechanism 690 may be configured to disengage a driving pawl 686 from a corresponding locked platform 670 once the corresponding biasing element 650 is fully loaded.

FIGS. 6B and 6C depict the embodiment of the kinetic energy conversion system 602 of FIG. 6A with the first biasing element 650a compressed. The first driving pawl 686a is shown disengaged from locked platform 670a. The locked platform 670a is engaged with the teeth 684 of the ratchet face 682 to hold the first biasing element 650a in a strained position storing potential energy. A second driving pawl 686b is engaged with locked platform 670b, thereby driving locked platform 670b to compress biasing element 650a. The remaining driving pawls 686c and 686d are yet to engage the corresponding locked platforms 670. Once the second biasing element 650b is loaded, the disengaging mechanism 690 may disengage the driving pawl 686b from the locked platform 670b. Driving pawl 686c will then engage locked platform 670c and begin loading biasing element 650c. Any number of biasing elements 650 may be sequentially loaded in this manner.

When all of the biasing elements 650 have been loaded, the kinetic energy conversion system 602 may release the stored potential energy. The kinetic energy conversion system 602 may further comprise a release mechanism 685 to simultaneously release all of the locked platforms 670. The locked platforms 670 may be configured to release simultaneously to allow the biasing elements 650 to simultaneously release the respective stored potential energy in each. For example, as depicted in FIGS. 6A and 6C, the release mechanism may be configured to displace the ratchet face 682, to thereby disengage the teeth 684 from the locked platforms 670. When all the biasing elements 650 are loaded, the last driving pawl 686d may disengage from the locked platform 670d. The driving mass 660 may then continue to drop, thereby allowing the release mechanism 685 to displace the ratchet face 682. As shown in FIGS. 6A and 6C, the release mechanism 685 may comprise a trigger to displace the ratchet mechanism 680 by causing it to pivot away from the locking platforms 670, thereby disengaging the teeth 684 and the locking platforms 670 and allowing the biasing elements 650 to release stored potential energy.

Figure 6D:
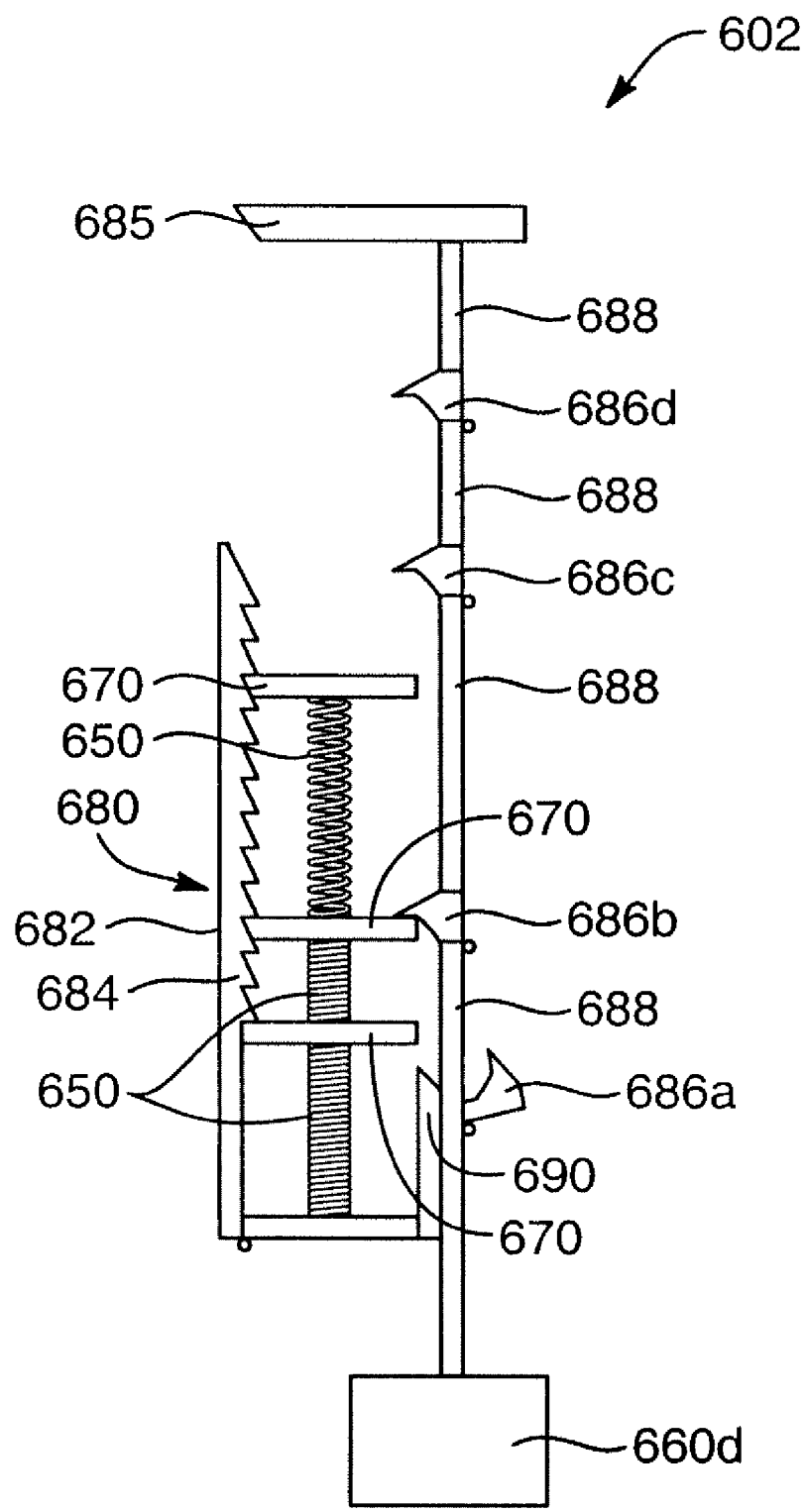
FIG. 6D is a side elevation view of another embodiment of a kinetic energy conversion system.

FIG. 6D is a side elevation view of another embodiment of a kinetic energy conversion system 602. The embodiment is similar to the embodiment of FIGS. 6A-6C, but with a different configuration for the driving mass 660d. The driving mass is positioned below the ratcheting mechanism.

The same basic concept of FIGS. 6A-6D may be applied to a pendulum actuated rotating gear to load multiple compression springs or torsion springs. The basic configuration of a pendulum actuated rotating gear embodiment is explained in conjunction with the next figures.

Figure 7A:
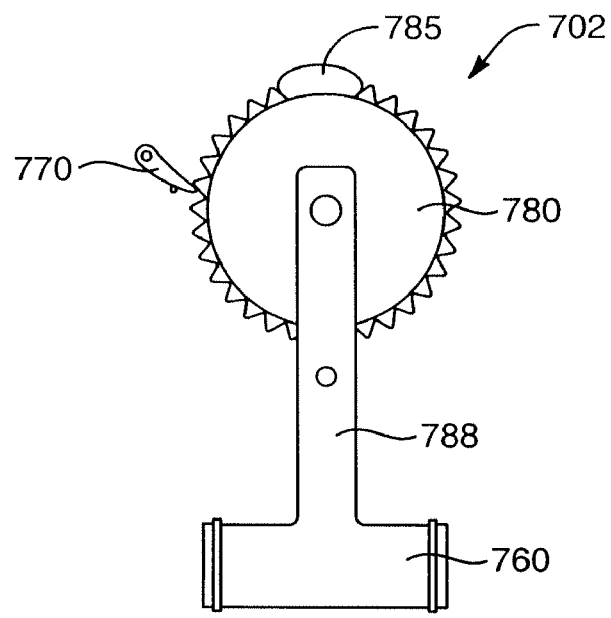
FIG. 7A is a front elevation view of another embodiment of a kinetic energy conversion system.

FIG. 7A is a front elevation view of another embodiment of a kinetic energy conversion system 702 comprising a pendulum 760 configured to rotate a ratchet gear 780 as it swings. As the ratchet gear rotates, a biasing element (not shown) is loaded, thus storing potential energy. The pendulum 760 may be coupled to a pendulum lever 788. The pendulum lever 788 may be configured to cause the ratcheting gear to swing about the same axis around which the ratcheting gear rotates. The pendulum lever 788 and the pendulum 760 may be optimized for specific loads. For example, the center of mass may be optimized to be sensitive to typical ambient movement. The embodiment may further comprise a pawl 770, which may allow rotation of the gear 780 in only one direction, a loading direction. The embodiment may further comprise a cam 785, which may be coupled to the ratchet gear 780 to cause the pawl 770 to temporarily disengage. The pawl 770 may be reset to engage the biasing element 750 after the potential energy is fully released. In another embodiment, the pawl 770 may be reset by a reset latch (not shown).

Figure 7B:
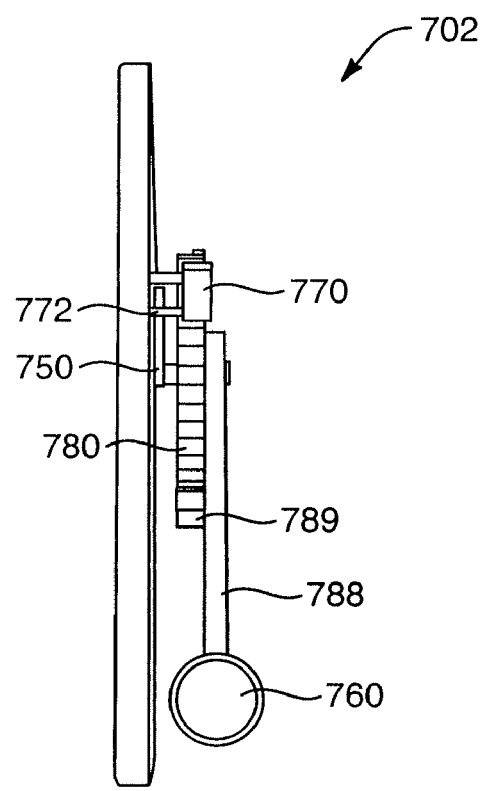
FIG. 7B is a side elevation view of the embodiment of a kinetic energy conversion system of FIG. 7A.

FIG. 7B is a side elevation view of the embodiment of a kinetic energy conversion system 702 of FIG. 7A. The perspective of this figure depicts the biasing element 750. The biasing element 750 may be a torsion spring. Displacement of the torsion spring to a plurality of strained positions may coincide with rotation of the ratchet gear 780. In one embodiment, a first end of the torsion spring 750 may be secured to the ratchet gear 780, while a second end may be secured by a spur (not depicted) or a pawl stop not rotating with the ratchet gear 780.

Also depicted in FIG. 7B, a driving pawl 789 may be coupled to the pendulum lever 788 to engage and rotate the ratchet gear 780 as the pendulum 760 swings in one direction, the loading direction, while allowing the pendulum 760 and pendulum lever 788 to swing freely back in an opposite direction.

Figure 7C:
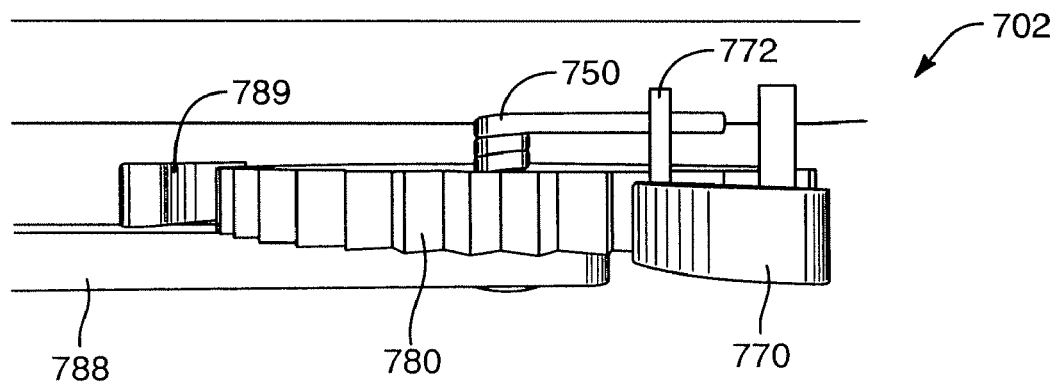
FIG. 7C is a close-up side elevation view of the embodiment of a kinetic energy conversion system of FIG. 7A.

FIG. 7C is a close-up side elevation view of the embodiment of a kinetic energy conversion system 702 of FIG. 7A. As depicted in FIG. 7C, the pawl 770 may further comprise a pawl stop 772, which is configured to engage another end, the second end of the torsion spring 750. As the ratchet gear 780 rotates, the free end of the torsion spring 750 engages the pawl stop 772 and is secured. With the free end secured, the secured end coupled to the ratchet gear is able to displace the torsion spring 750 to a strained position as the ratchet gear 780 rotates.

Figure 7D:
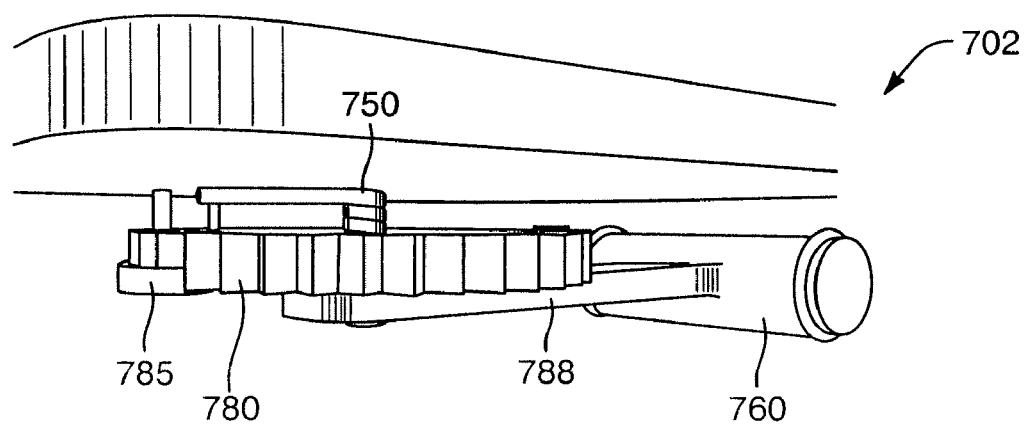
FIG. 7D is a top elevation view of the embodiment of a kinetic energy conversion system of FIG. 7A.

FIG. 7D is a top elevation view of the embodiment of a kinetic energy conversion system 702 of FIG. 7A. As depicted in FIG. 7D, the cam 785 coupled to the ratchet gear 780 eventually rotates far enough in the loading direction to temporarily displace the pawl 770, thereby displacing the pawl stop 772 and allowing the torsion spring 750 to release the stored potential energy. In another embodiment, the surface of the pawl stop 772 may be maintained in contact with the flat surface of the pawl 770 by the force of the torsion spring 750.

In another embodiment, the cam 785 may displace the pawl 770 past the point of being in contact with the end of the pawl stop 772. The pawl stop 772 may extend and thus prevent the pawl 770 from engaging the ratchet gear 780. The ratchet gear 780 may then be free to rotate in the direction opposite the loading position, the ratchet gear 780 being driven by the stored energy of the biasing element 750. The energy storage and release process may then be repeated by reversing the direction of the pawl stop 772 until it clears the pawl 770 and re-establishes the initial condition of the system 702.

Figure 8:
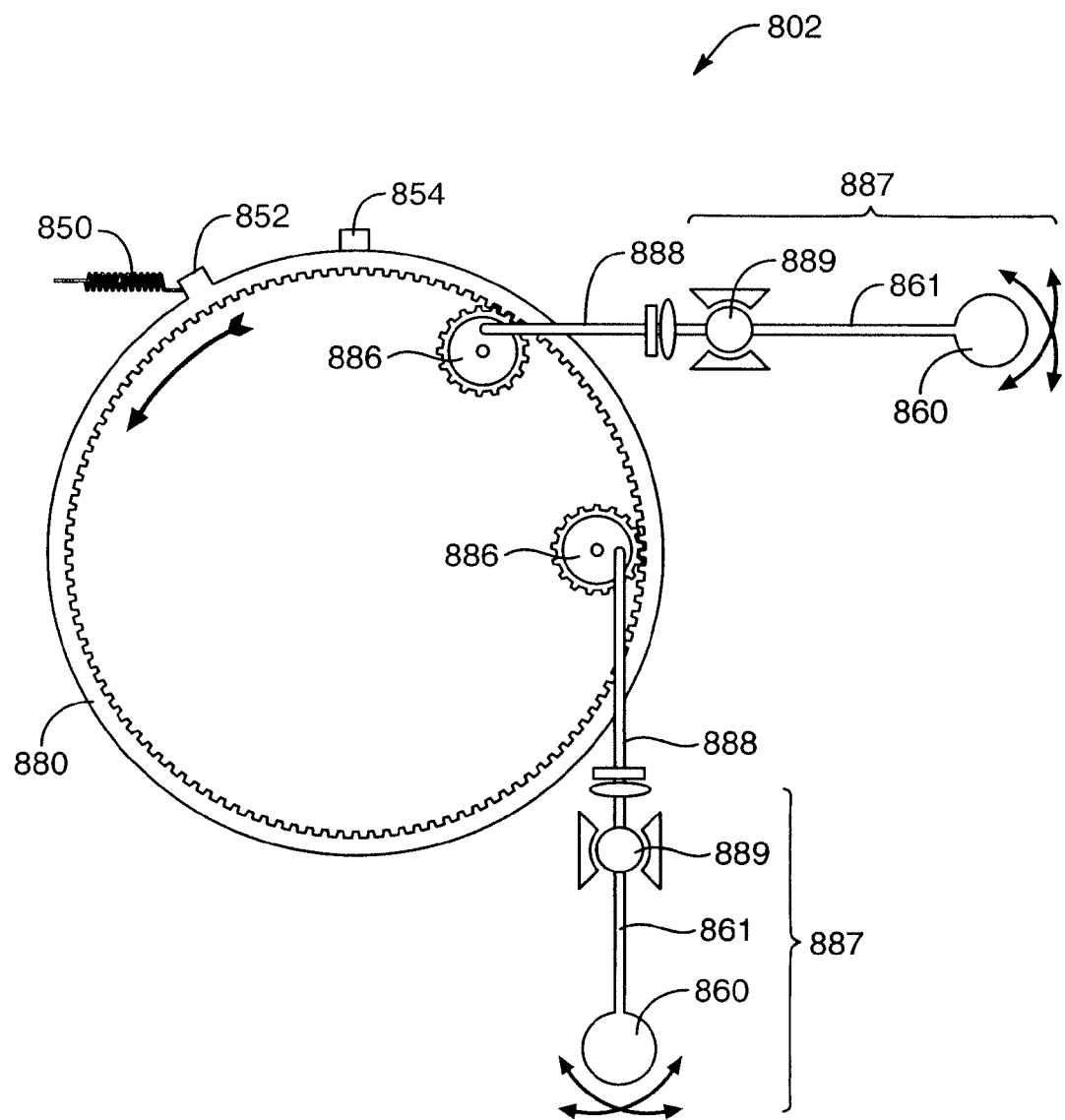
FIG. 8 is a side elevation view of an embodiment of a multiaxial kinetic energy conversion system comprising a ring gear configured to displace a plurality of biasing elements as it rotates.

FIG. 8 is a side elevation view of another embodiment of a multiaxial kinetic energy conversion system 802. The embodiment may comprise a ring gear 880 configured to rotate about a center axis and displace a plurality of biasing elements 850 to a plurality of strained positions storing increasing quantities of potential energy. The ring gear 880 may also be described as a planetary ring gear. The ring gear 880 may have gear teeth on the inside edge. The ring gear 880 may also have a plurality of spurs 852 protruding from the outer edge. The biasing elements 850 may be coupled to the spurs 852, as depicted in FIG. 8. The spurs 852 may also be configured to release energy to the primary phase or to a resonant electrical generator. The energy is released to the primary phase or resonant electrical generator by striking other spurs on the primary phase or resonant electrical generator when the stored potential energy is released.

The embodiment may further comprise a plurality of low frequency, multi-axial vibrating beam-spring mechanisms 887 that rotate about a ball joint 889 in response to ambient energy. A multi-axial vibrating beam-spring mechanism 887 may comprise a driving mass 860 coupled to a free end of a cantilever beam 861. The cantilever beam-spring 887 may further comprise a ball joint 889 coupled at or near a fixed end of the cantilever beam 861. As is apparent from FIG. 8, the driving mass 860 may be free to move along two axes. The low frequency, multi-axial vibrating beam-spring mechanism may be tuned to have a natural frequency near the frequency of the primary driving force, such as the motion of a person or animal, the flight motion of a bird, or the vibration frequency of a vehicle, to name a few examples.

As depicted in FIG. 8, two low frequency, multi-axial vibrating beam-spring mechanisms 887 may be set at right angles to each other to ensure that at least one of the beams will have at least a partially horizontal orientation to the ground to thereby leverage the force of gravity. Motions along the axis of the cantilever beam 861 may not efficiently induce movement of the driving mass 860; at least not sufficient movement of the driving mass to displace the plurality of biasing elements 850.

Each multi-axial vibrating beam-spring mechanism 887 may be coupled to a cam interface 889. The vibrating beam-spring mechanism 887 may be configured to drive a corresponding piston 888 via the corresponding cam interface 889. The cam interface 889 may be a disk-type cam interface. The pistons 888, in turn, may drive a plurality of ratcheting gears 886, which in turn drive the ring gear 880 and displace the plurality of biasing elements 850.

The embodiment may be further configured to release the potential energy stored in the plurality of biasing elements 850. For example, the ratcheting gears 886 may periodically disengage from the ring gear 880. In another embodiment, the pistons 888 may release from the ratcheting gears 886. When the embodiment releases the potential energy from the plurality of biasing elements 850, the energy may be used to generate a resonant oscillation of a resonant electrical generator.

Any of the foregoing embodiments of a kinetic energy conversion system may be coupled to a resonant electrical generator. Those skilled in the art will recognize that such embodiments of a kinetic energy conversion system may effectively harvest energy from ambient energy, including lower frequency ambient motion and acoustic vibrations, and use the stored energy to supplement resonant electrical energy generation.

Figure 9:
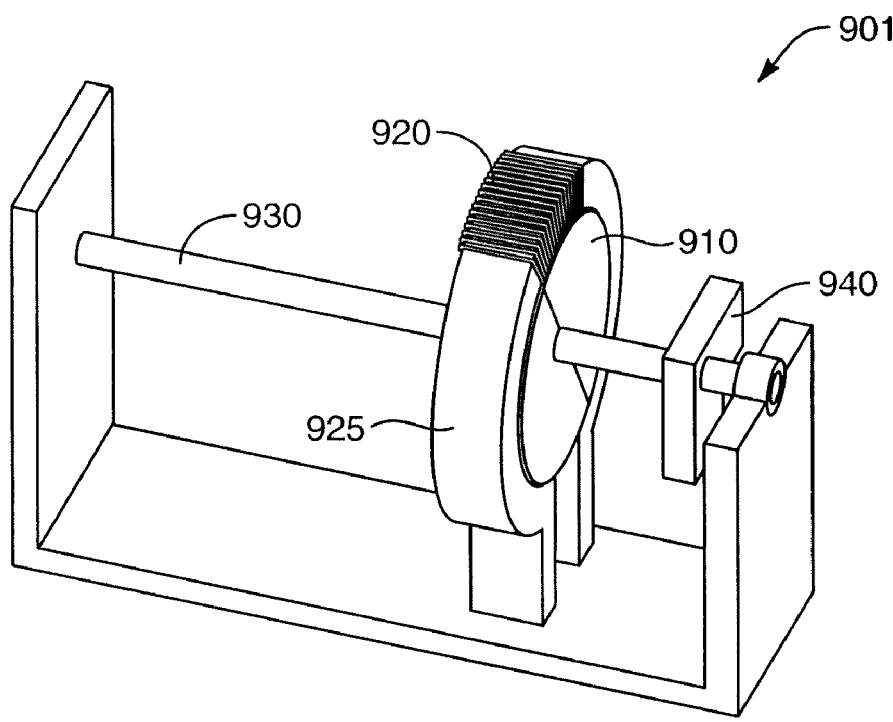
FIG. 9 is a perspective view of an embodiment of a resonating electrical generator.

FIG. 9 is a perspective view of an embodiment of a resonating electrical generator 901. The embodiment may comprise a diametrically poled magnet 910. The magnet 910 may be disk-shaped. The magnet 910 may be rotatably moveable within a core 925. A coil 920 may be wrapped around a portion of the core 925. The magnet 910 may be coupled to a biasing element 930 to enable a resonant oscillation of the magnet 910 relative to the coil 920. The magnet 910 generates a magnetic field and the magnet is positioned so that the coil 920 is within the magnetic field. The rotating movement of the magnetic field with respect to the coil 920 generates a current in the coil 920. The current creates a voltage across two ends of the coil, as depicted in FIG. 1.

As depicted in FIG. 9, the biasing element 930 may comprise a torsion shaft having a free end and a fixed end. The magnet 910 may be coupled to the torsion shaft 930 near the free end, and thus be able oscillate in a rotating fashion as the torsion shaft 930 twists in response to ambient energy. In another embodiment, the biasing element 930 may comprise a torsion spring, a coil spring, or other biasing element.

The embodiment shown in FIG. 9 may further comprise an offset mass 940 coupled to the torsion shaft 930 to increase twisting of the torsion shaft 930 in response to ambient energy. As the torsion shaft 930 twists, the magnet 910 rotates within the core 925 relative to the coil 920. Rotation of the magnet 910 generates a current in the coil 920. The offset mass 940 enables response to ambient movements in a vertical and a horizontal direction, making the resonating electrical generator 901 multiaxial. Movement along the axis of the torsion shaft 930 may not produce oscillation, and thus may not produce electrical energy in the coil.

Figure 10:
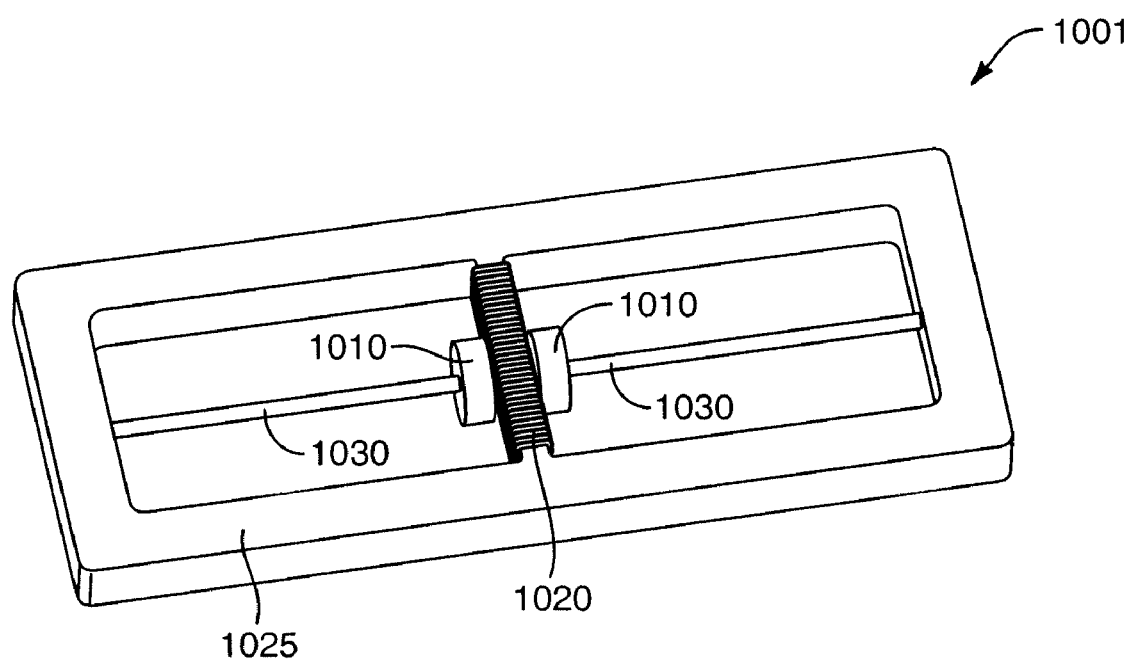
FIG. 10 is a perspective view of another embodiment of a resonating electrical generator.

FIG. 10 is a perspective view of another embodiment of a resonating electrical generator 1001. The embodiment may comprise a core 1025 having a central crossbar. A coil 1020 may be wrapped around the central crossbar of the core 1020. Two cantilever beams 1030 may be supported at a fixed end of each beam 1030 by the core 1025. To generate electricity, magnets 1010 may be suspended on a free end of each cantilever beam 1030. As depicted in FIG. 10, the embodiment may comprise multiple magnets 1010 positioned on different sides of the coil 1020 to generate a magnetic field in which the coil 1020 is positioned. The cantilever beams 1030 facilitate oscillation of the magnets 1010 in response to multiaxial ambient movement. The cantilever beams 1030 may be responsive to movement in a horizontal and a vertical direction. The oscillating motion of the magnets 1030 causes movement of a magnetic field relative to the coil 1020 and thereby generates an electric current within the coil 1020.

Figure 11:
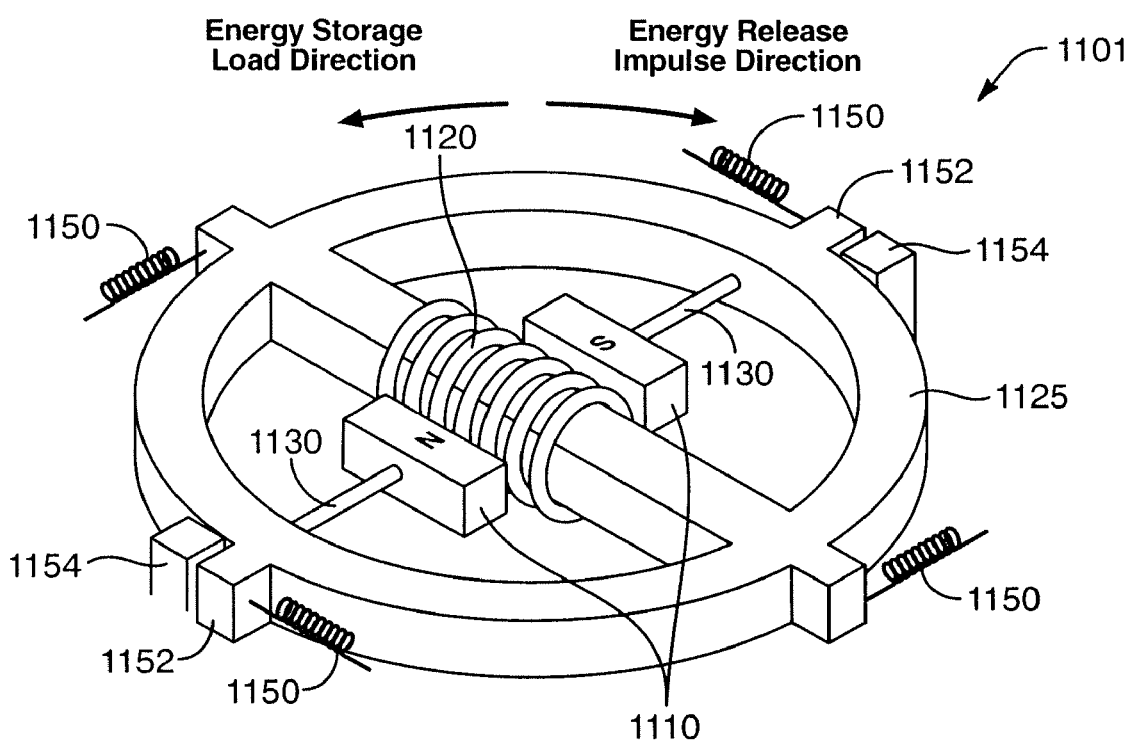
FIG. 11 is a perspective view of still another embodiment of a resonating electrical generator.

FIG. 11 is a perspective view of still another embodiment of a resonating electrical generator 1101. The embodiment may have a ring-shaped core 1125 with a central cross-bar and a coil 1120 wrapped around the central crossbar. The embodiment may further comprise two cantilever beams 1130 each supported at a fixed end by the core 1125. Magnets 1110 may be coupled to a free end of each cantilever beam 1130. The magnets 1110 may generate a magnetic field. The magnets 1110 may be positioned such that the coil 1120 is within the magnetic field. Moreover, the magnets 1110 may be positioned on different sides of the coil 1120 to enhance the magnetic field within which the coil may be situated. Movement of the magnetic field relative to the coil 1120 produces electrical current within the coil 1120.

The core 1125 may be configured to rotate in response to ambient movement. For example, the core 1125 may be coupled to a torsion shaft as depicted in FIG. 10. In another embodiment, rotation of the core 1125 may be due to being coupled to a kinetic energy conversion system such as that depicted in FIG. 8. Rotation of the ring-shaped core 1125 may result in oscillations of the magnets 1130. In another embodiment, the kinetic energy conversion system of FIG. 8 may periodically and impulsively release stored potential energy that causes an oscillation of the core 1125. Both the rotating movement of the core 1125 and multiaxial ambient movement may result in oscillation of the magnets 1110 on the cantilever beams 1130. Movement of the magnets 1110 results in movement of the magnetic field relative to the coil 1120. Movement of the magnetic field generates an electric current within the coil 1120.

Figure 12A:
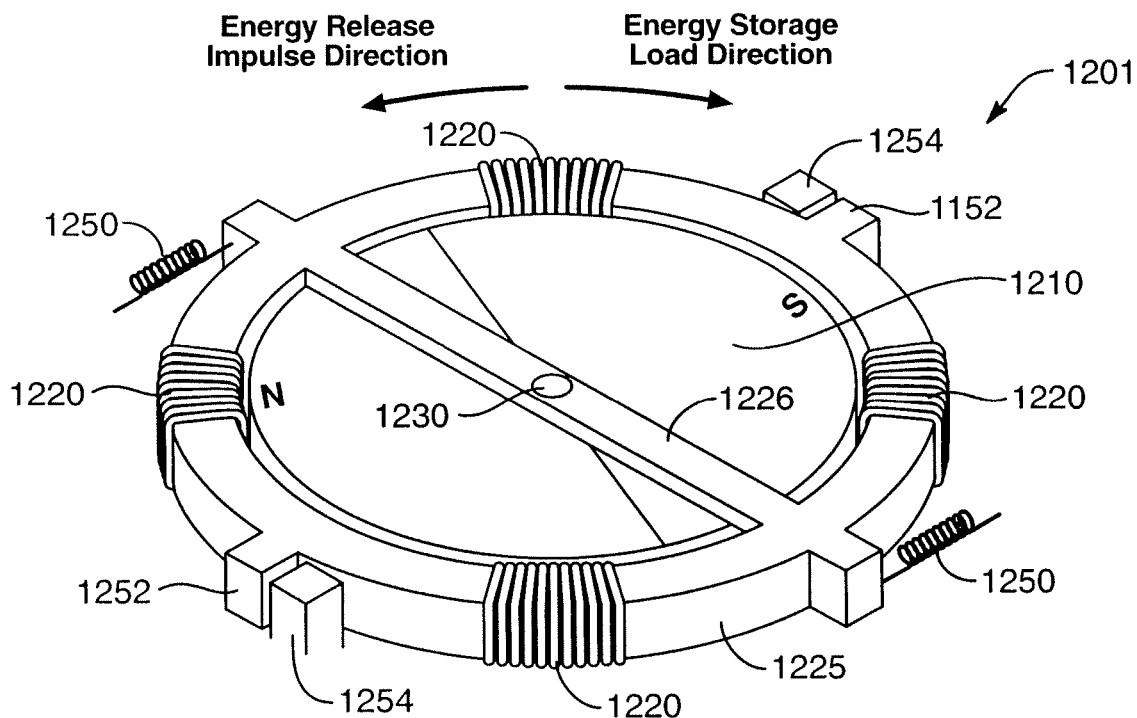
FIG. 12A is a perspective view of still another embodiment of a resonating electrical generator.

FIG. 12A is a perspective view of yet another embodiment of a resonating electrical generator 1201 having a ring-shaped core 1225. A plurality of coils 1220 may be wrapped around the ring of the core 1225. The embodiment may further comprise a supporting crossbar 1226 on the core 1225 to support a diametrically poled magnet 1230. The magnet 1230 may be configured to rotate about a central axis by a biasing element 1210 coupled to the supporting crossbar 1226 of the core 1225. The magnet 1230 may be rotatably moveable within the ring-shaped core 1225 in proximity to the plurality of coils 1220 such that the coils 1220 are within the magnetic field created by the magnet 1230. The magnet 1230 may be disk-shaped.

The biasing element may be a torsion spring or a coil spring. Ambient energy may generate rotational oscillation of the magnet 1230. Rotational oscillation of the magnet 1230 may result in movement of the magnetic field relative to the plurality of coils 1220 and thereby generate electrical current within the coils 1220.

Rotational oscillation of the magnet 1230 with respect to the coils 1220 may be produced in response to multiaxial ambient movement. Rotational oscillation may also be caused by a kinetic energy conversion system releasing stored energy to cause a resonant oscillation. As depicted in FIG. 12A, the ring shaped core may be coupled to a plurality of biasing elements 1250. The embodiment of FIG. 12A may be coupled to a kinetic energy conversion system such as the embodiment depicted in FIG. 8. The kinetic energy conversion system may ratchet the core 1225 and thereby displace the biasing elements 1250 to a strained position storing potential energy. When the kinetic energy conversion system releases the stored energy, it may generate a resonant oscillation of the ring-core and/or the magnet with respect to each other. The embodiment may further comprise spurs 1252 configured to contact fixed spurs 1254 to facilitate generation of the resonant oscillation.

Figure 12B:
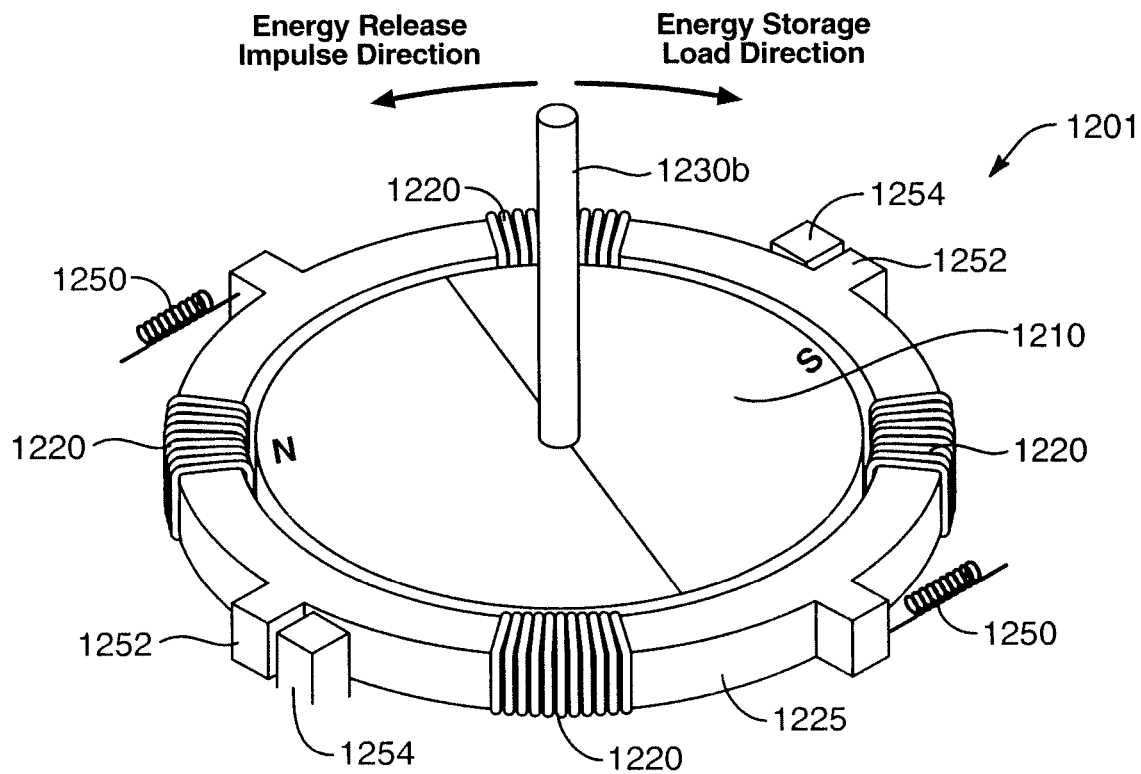
FIG. 12B is a perspective view of a still another embodiment of a resonating electrical generator.

FIG. 12B is a perspective view of yet another embodiment of a resonating electrical generator 1201b having a ring-shaped core 1225. The core may be the same core 1225 as depicted in FIG. 12A, but without a supporting crossbar 1226. As before, a plurality of coils 1220 may be wrapped around the ring of the core 1225. Similarly, the magnet 1230 may be configured to rotate about a central axis by a biasing element 1210b. The magnet 1230 may be rotatably moveable within the ring-shaped core 1225 in proximity to the plurality of coils 1220 such that the coils 1220 are within the magnetic field generated by the magnet 1230. The magnet 1230 may be disk-shaped.

As depicted in FIG. 12B, the biasing element 1210b may be a torsion shaft. The magnet 1230 may be coupled to the torsion shaft 1210b and configured to rotate in the ring-shaped core 1225 as the torsion shaft 1210b twists. Rotation of the magnet 1230 may result in movement of the magnetic field relative to the plurality of coils 1220 and thereby generate electrical current within the coils 1220.

Rotational oscillation of the magnet 1230 with respect to the coils 1220 may be produced in response to multiaxial ambient movement. Rotational oscillation may also be caused by a kinetic energy conversion system releasing stored energy to cause a resonant oscillation. As depicted in FIG. 12B, the ring shaped core may be coupled to a plurality of biasing elements 1250. The embodiment of FIG. 12B may be coupled to a kinetic energy conversion system, such as the embodiment depicted in FIG. 8. The kinetic energy conversion system may ratchet the core 1225 and thereby displace the biasing elements 1250 to a strained position storing potential energy. When the kinetic energy conversion system releases the stored energy, it may generate a resonant oscillation of the ring-core and/or the magnet with respect to each other. The embodiment may further comprise spurs 1252 configured to contact fixed spurs 1254 to facilitate generation of the resonant oscillation. The fixed spurs may be coupled to the torsion shaft 1210b such that striking the spurs generates a rotational resonant oscillation of magnet 1230.

Figure 13:
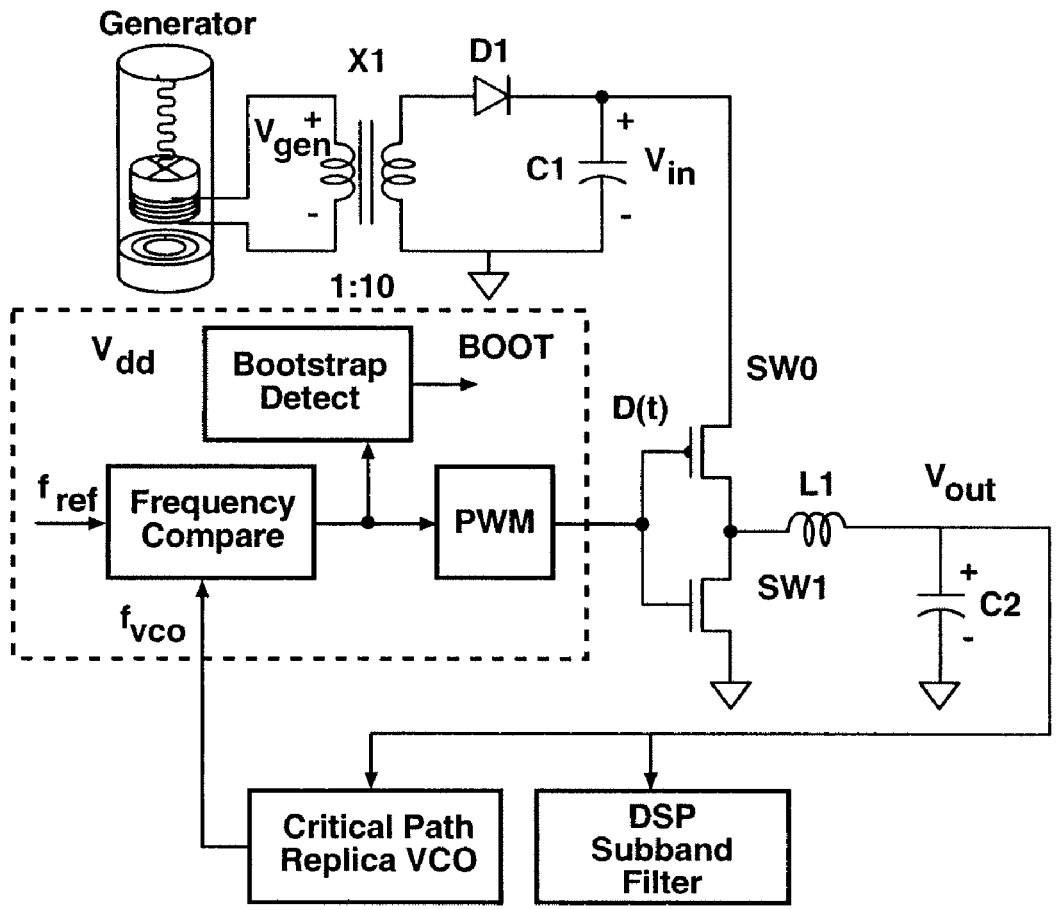
FIG. 13 is a diagram of one embodiment of a control circuit coupled to a system for generating electrical energy from ambient energy.

FIG. 13 is a diagram of one embodiment of a control circuit coupled to a system for generating electrical energy from ambient energy. The control circuit may control how much electrical energy is delivered to a device requiring power, whether the device requires the power to operate or to charge a battery.

Figure 14A:
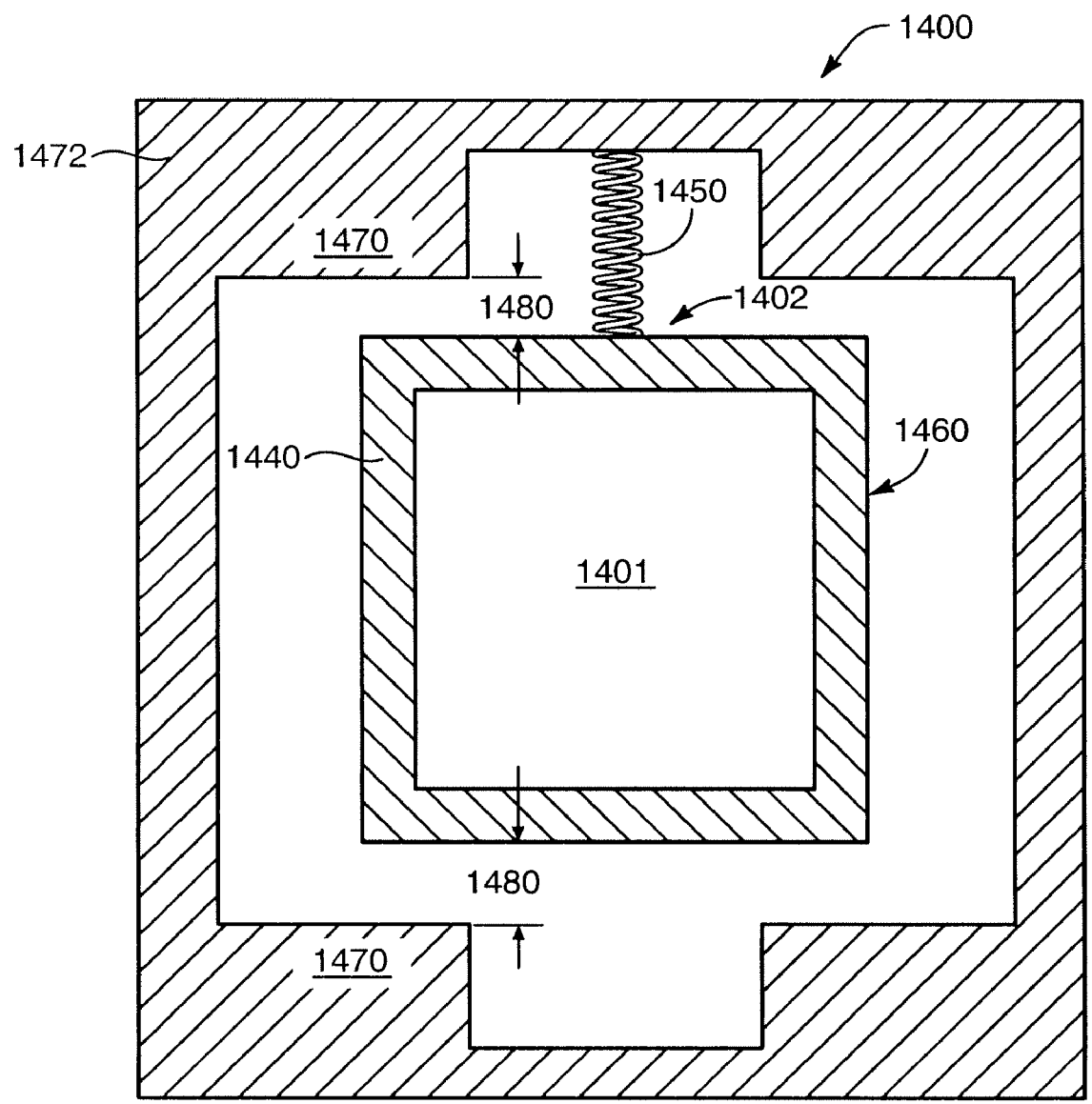
FIG. 14A is a cross-sectional side view of one embodiment of a system for generating electrical energy from multiaxial ambient energy.

FIG. 14A is a cross-sectional side view of another embodiment of a system 1400 for generating electrical energy from multiaxial ambient energy. Similar to previously described embodiments, the illustrated embodiment 1400 comprises two stages: an electrical generator 1401 and a kinetic energy conversion system 1402. The electrical generator 1401 can be any vibration-driven electrical generator adapted to efficiently generate electrical energy. The kinetic energy conversion system 1402 is configured to harvest energy from low frequency ambient motion and then transfer that energy into the electrical generator 1401 through a short duration impulse. The energy is transferred as an impulse that imparts a larger relative acceleration to the generator causing it to oscillate at its resonant frequency and/or deflect a greater amount than it would without the short duration impulse.

The kinetic energy conversion system 1402 converts energy from low frequency motion to strain energy, which can be impulsively imparted to drive the electrical generator 1401. The kinetic energy conversion system 1402 comprises a biasing element 1450, a driving mass 1460, stops 1470, and gaps 1480 that aid in harvesting ambient energy and transferring the harvested energy to the electrical generator 1401. The biasing element 1450, the driving mass 1460, the stops 1470, and the gaps 1480 may be fully or partially enclosed within a housing 1472.

The biasing element 1450 may be a spring, as depicted in FIG. 14A. The biasing element 1450 combined with the driving mass 1460 can have a low natural frequency adapted to be excited by low frequency ambient motion. When the biasing element 1450 is properly tuned, even subtle ambient motions can cause the driving mass 1460 to displace the biasing member 1450 and generate relative motion which stores strain energy. In this manner, the kinetic energy of low frequency ambient motions is translated to strain energy.

The kinetic energy conversion system 1402 is multiaxial in that it can harvest kinetic energy from ambient motions in a plurality of directions. Ambient motions in a direction longitudinal to the biasing element 1450 may result in the driving mass 1460 moving in a linear fashion and driving the biasing element 1450 such that it compresses and/or extends to a strained position. Ambient motions in a direction lateral to the biasing element may result in the driving mass 1460 moving laterally and driving the biasing element 1450 to oscillate back and forth, causing the driving mass 1460 and biasing element 1450 to swing through an arc similar to a pendulum. The illustrated kinetic energy conversion system 1402 can harvest energy from motion in a plurality of directions.

The strain energy stored by the biasing element 1450 when forced to a strained position can be impulsively imparted to the vibration-driven electrical generator 1401 to drive efficient production of electrical energy. Depending on the type of vibration-driven generator 1401, the energy imparted may be used to produce high frequency oscillations or to increase the amplitude and/or the magnitude of the force. How the energy is used to drive the electrical generator 1401 depends on the type of the electrical generator 1401. For example, the energy can drive a high frequency oscillation to drive a resonating electrical generator. As another example, the energy can be used to create a create an optimal acceleration force. A Coulomb-force parametric generator can be driven to generate electricity by optimal acceleration of a mass within the generator, thereby causing the mass to snap between end stops within a frame.

The transfer of harvested energy occurs when the driving mass 1460 strikes one or more of the stops 1470. The driving mass 1460 is free to move in the gaps 1480 between the stops 1470 and the driving mass 1460 until a combination of strain energy, ambient energy, and/or gravity produce an excitation of sufficient force that the driving mass 1460 strikes a top or bottom stop 1470. For example, the momentum of the driving mass 1410, in response to an ambient motion, may cause the biasing element to compress or extend sufficient to result in impact. Upon the driving mass 1460 striking a stop 1470, the harvested energy is impulsively imparted into the electrical generator 1401. In the illustrated embodiment, the driving mass 1460 comprises the electrical generator 1401. The force of impact of the driving mass 1460 against the one or more stops 1470 can drive the electrical generator 1401 within the driving mass 1460.

The size of the gaps 1480 between the driving mass 1460 and the stops 1470 can be varied depending on the ambient energy to be harvested. For example, ambient energy created by a device being moved by the vibrations of an automobile driving down the highway will be different than ambient energy created by a device being moved by the oscillations of ocean waves. Accordingly, the gaps 1480 within a system may be adjusted to tune the device accordingly. The gaps 1480 can be configured such that even subtle ambient motions result in the driving mass 1460 colliding with the stops 1470.

The cross-sectional view does not show inside the electrical generator 1401. Rather, the electrical generator 1401 is depicted as a "black box" to indicate that the electrical generator 1401 may comprise any electrical generator suitable for being driven by the kinetic energy conversion system 1402. For example, the electrical generator 1401 can be vibration-driven electrical generator.

Typically vibration-driven electrical generators have a mass that moves within a frame. An operating principle of such vibration-driven electrical generators is that the inertia of the mass results in movement relative to the frame when the frame is accelerated. The movement relative to the frame creates a relative displacement. The displacement can be used to generate electrical energy by causing work to be done against a damping force. The damping force can be created by an electric or magnetic field, or by the tension in a piezoelectric material. Accordingly, vibration-driven electrical generators can be based on electromagnetic, electrostatic, or piezoelectric technologies. A vibration-driven electrical generator based on electromagnetic technology can include any velocity-damped resonant-generator, including the biasing element, magnet, and coil generators previously discussed. Examples of vibration-driven electrical generators based on electrostatics may include a Coulomb-damped resonant-generator and a Coulomb-force parametric-generator. These generators are known in the art and descriptions of specific embodiments can be found in industry journals and issued patents. Examples of specific embodiments utilizing a velocity-damped resonant generator are discussed in greater detail below.

While the system described in FIG. 14A illustrates a dual-stage system, persons of skill in the art can appreciate that the concept can be extended to additional stages, with varying ratios of kinetic energy conversion systems to electrical generators. A variety of combinations of stages are possible. In one embodiment, a system for generating energy from multiaxial ambient motion may have a plurality of kinetic energy conversion systems positioned in parallel or in series. The plurality of kinetic energy conversion systems can be positioned at different orientations, to more efficiently transfer multiaxial ambient motions into higher frequency or higher amplitude excitations. In another embodiment, a plurality of kinetic energy conversion systems may be nested together. In still another embodiment, a kinetic energy conversion system may comprise multiple spring biasing elements configured to enable resonant oscillation in response to multiaxial ambient motions. In still another embodiment, a plurality of electrical generators can be positioned in parallel, or in series, and can be positioned at different orientations. In still another embodiment, the electrical generator may comprise multiple spring biasing elements configured to permit high frequency oscillation of the magnet in multiple directions.

The system illustrated in FIG. 14A can also be extended so as to store and translate a range of low frequency input motions to higher frequency excitations. In one embodiment, a plurality of kinetic energy conversion systems can be positioned in parallel or in series, each having a biasing element 1450 with a different resonant frequency. A plurality of resonant frequencies allows a range of ambient motions to excite resonant oscillations. For example, one of the plurality of kinetic energy conversion systems may be excited to resonant oscillations by a slow casual stroll of an individual, whereas a different one of the plurality of kinetic energy conversion systems may be excited to resonant oscillations by a faster, more deliberate walk.

In another embodiment, the biasing element 1450 of the kinetic energy conversion system 1402 may comprise a flexible membrane. In still another embodiment, the biasing element 1450 of the kinetic energy conversion system 1402 may comprise a cantilever beam. In still another embodiment, the biasing element 1450 of the kinetic energy conversion system 1402 may comprise a torsion shaft, and include an offset mass to drive rotation of the torsion shaft and the magnet.

Figure 14B:
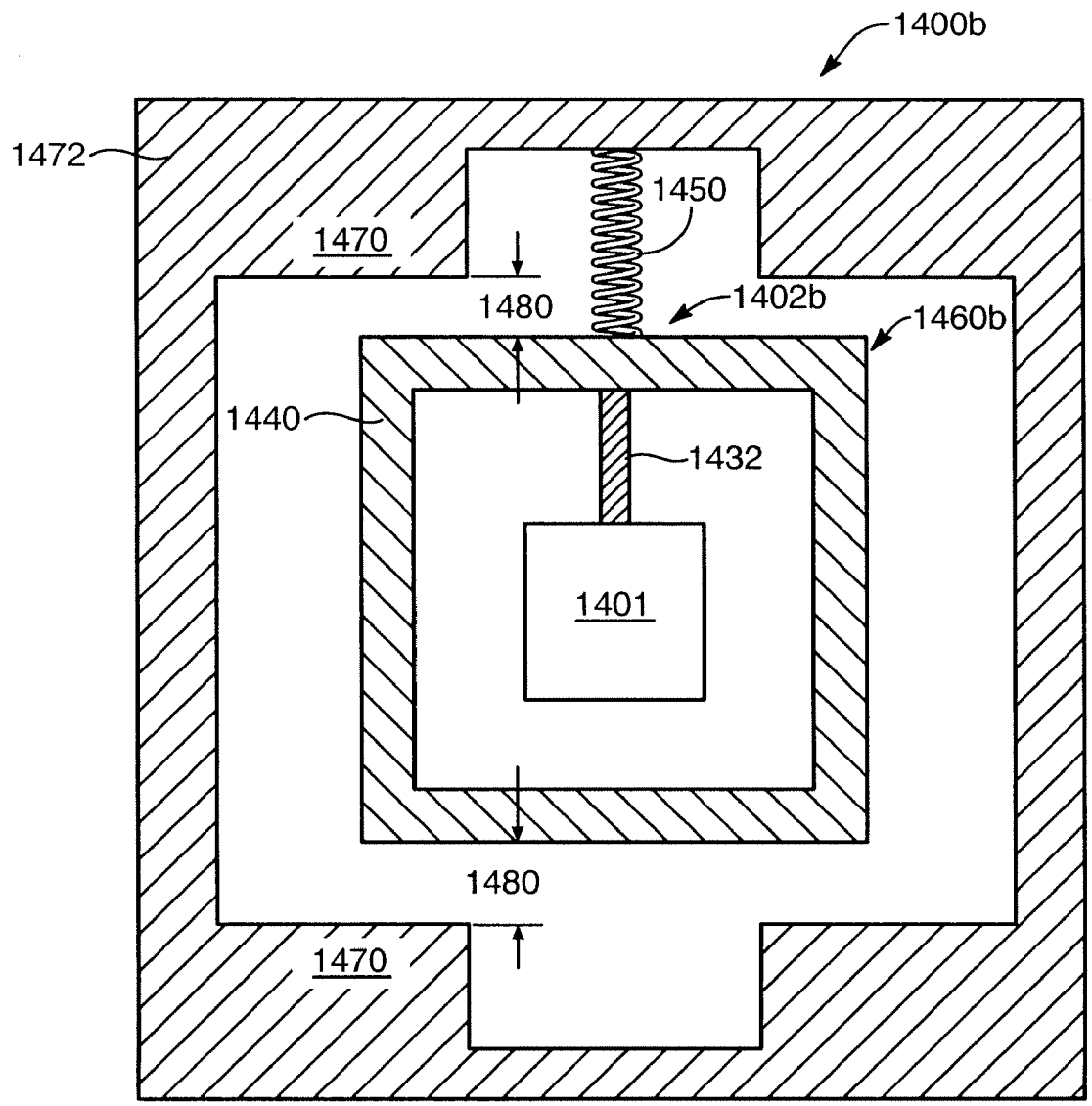
FIG. 14B is a cross-sectional side view of another embodiment of a system for generating electrical energy from multiaxial ambient energy.

FIG. 14B is a cross-sectional side view of another embodiment 1400b of a system for generating electrical energy from multiaxial ambient energy. Similar to the embodiment of FIG. 14A, the illustrated embodiment 1400b comprises two stages: an electrical generator 1401 and a kinetic energy conversion system 1402b. Like the embodiment of FIG. 14A, the kinetic energy conversion system 1402b comprises a biasing element 1450, a driving mass 1460b, stops 1470, and gaps 1480. The biasing element 1450, the driving mass 1460b, the stops 1470, and the gaps 1480 may be fully or partially enclosed within a housing 1472. The driving mass 1460b of the kinetic energy conversion system 140b can further comprise a rigid connection 1432 to aid in transferring energy to the electrical generator 1401. The rigid connection 1432 can couple the electrical generator 1401 to the driving mass housing 1440. The rigid connection 1432 can be formed of metal or rigid plastic. Thus, any vibration or oscillation of the driving mass 1460b is directly transferred to the electrical generator 1401 via the rigid connection 1432. Similarly, harvested energy can be transferred from the driving mass 1460*b*, through the rigid connection 1432, to the electrical generator 1401.

As before, the cross-sectional view does not show the contents of the electrical generator 1401. Rather, the electrical generator 1401 is depicted as a "black box" to indicate that the electrical generator 1401 may comprise any vibration-driven electrical generator. For example the electrical generator 1401 may be a vibration-driven electrical generator based on electromagnetic, electrostatic, or piezoelectric technologies. If based on electromagnetic technology, the electrical generator 1401 can include any velocity-damped resonant-generator, including the biasing element, magnet, and coil generators previously discussed. If based on electrostatic technology, the electrical generator 1401 may include a Coulomb-damped resonant-generator and a Coulomb-force parametric-generator.

Figure 14C:
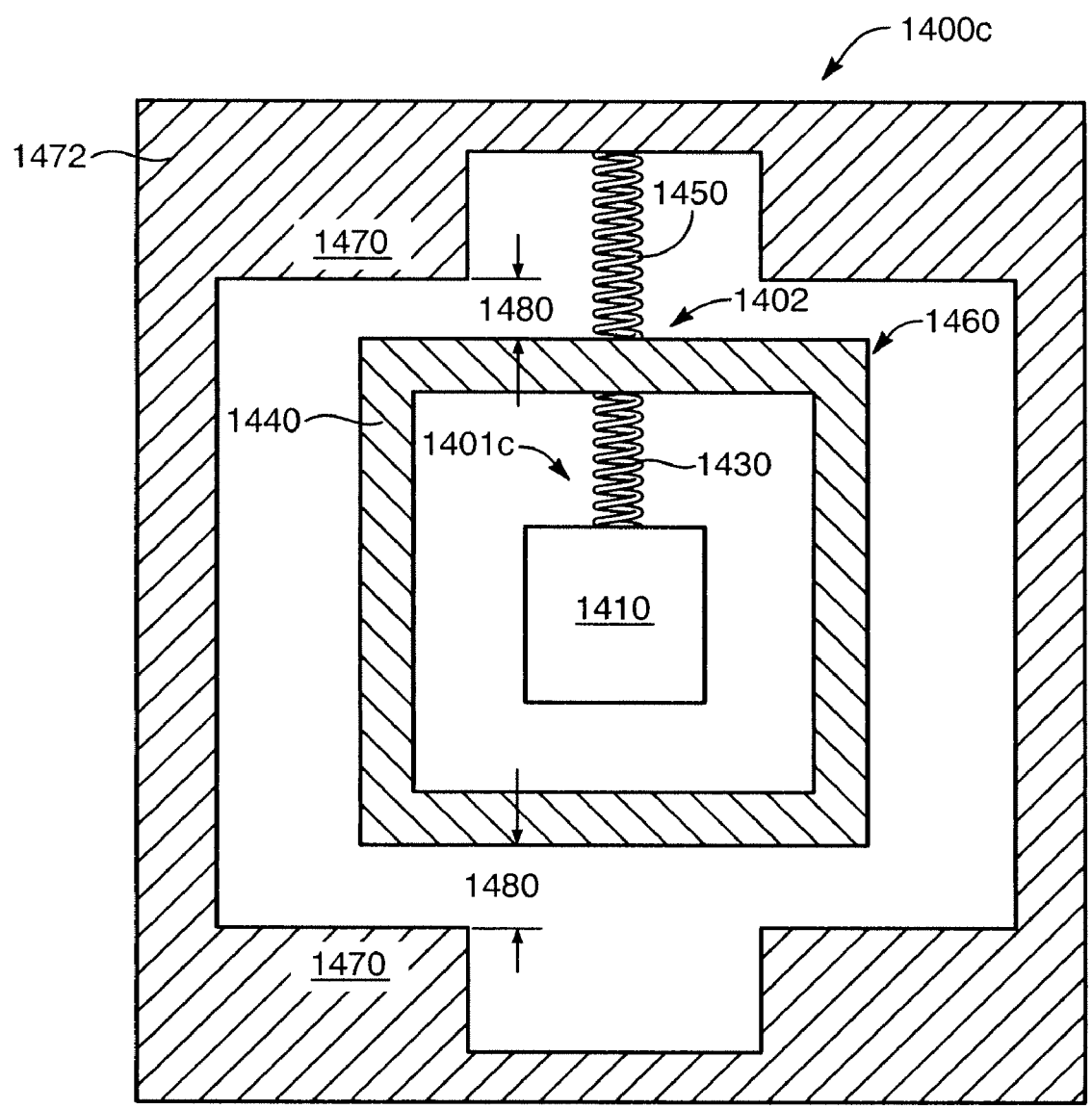
FIG. 14C is a cross-sectional side view of still another embodiment of a system for generating electrical energy from multiaxial ambient energy.

FIG. 14C is a cross-sectional side view of a specific embodiment 1400*c* of the system 1400 depicted in FIG. 14A comprising a vibration-driven electrical generator 1401*c* that is a type of velocity-damped resonant-generator. The vibration-driven electrical generator 1401*c* comprises a magnet 1410 disposed proximate to a coil (not depicted) and suspended by a biasing element 1430. The magnet and biasing member may be fully or partially enclosed within a housing 1440. In another embodiment, the coil may also be fully or partially enclosed within the housing 1440. The biasing element 1430 may be a spring, as depicted in FIG. 14B. In other embodiments, the biasing element 1430 may comprise a flexible membrane, a cantilever beam, or a torsion shaft. The biasing element 1430 may have a high natural resonant frequency in the range effective for efficient generation of electrical energy. When energy is impulsively imparted from the kinetic energy conversion system 1402 to the resonating electrical generator 1401*c*, the magnet 1410 oscillates relative to the coil at the resonant frequency. The magnet 1410 generates a magnetic field and the coil is within the magnetic field. Movement of the magnet 1410 relative to the coil results in movement of the magnetic field with respect to the coil and generates an electric current in the coil. In the depicted embodiment 1400*c*, the magnet 1410 can move relative to a stationary coil. In another embodiment, the coil can move relative to a stationary magnet.

The kinetic energy conversion system 1402 is multiaxial in that it can harvest kinetic energy from ambient motions in a plurality of directions. Ambient motions in a direction longitudinal to the biasing element 1450 may result in the driving mass 1460 moving in a linear fashion and driving the biasing element 1450 such that it compresses and/or extends to a strained position. Ambient motions in a direction lateral to the biasing element 1450 may result in the driving mass 1460 moving laterally and driving the biasing element 1450 to oscillate back and forth, such that the driving mass 1460 and biasing element 1450 swing through an arc similar to a pendulum. Although the illustrated kinetic energy conversion system 1402 can harvest energy from motion in a plurality of directions, the effectiveness of the kinetic energy conversion system 1402 is partially dependent on the direction of the pull of gravity. For the depicted embodiment the most efficient operation may occur when gravity is pulling in a direction generally from the biasing element down through the driving mass 1460.

Figure 15:
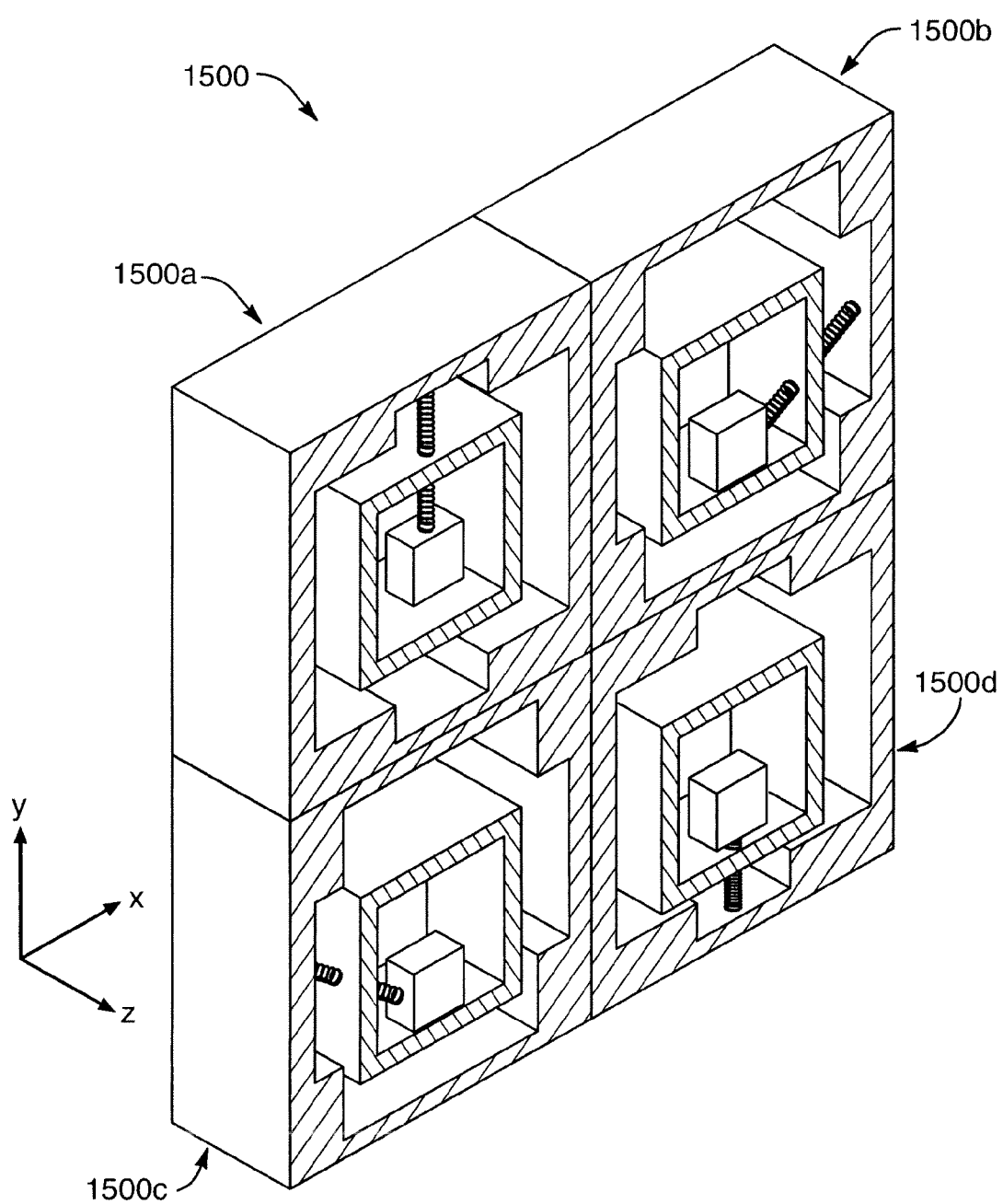
FIG. 15 is a perspective cut-away view of still another embodiment of a system for generating electrical energy from multiaxial ambient energy.

FIG. 15 is a perspective cut-away view of still another embodiment of a system for generating electrical energy from multiaxial ambient motion. As depicted, a plurality of systems for generating electrical energy from ambient motion can be arranged in parallel, or in series, at different orientations. Also indicated in FIG. 15 are three potential directions of ambient motion corresponding to an axis x, an axis y, and an axis z. The differing orientations of each system for generating electrical energy from ambient motion can enhance multiaxial generation of electrical energy from ambient motion in a plurality of directions without concern for the direction of the force of gravity.

In FIG. 15, system 1500 has four systems for generating electrical energy from multiaxial ambient motion 1500*a*, 1500*b*, 1500*c*, 1500*d*. Each of the four systems utilize a velocity-damped resonant generator as an electrical generator, similar to system 1400*c* as depicted in FIG. 14C. The systems 1500*a*, 1500*b*, 1500*c*, 1500*d* are each arranged to be responsive to ambient motion and gravity in a different direction. The system 1500*a* is configured to be responsive to ambient motion in a direction along the y axis when the force of gravity is pulling down the y axis as depicted. The system 1500*d* is also configured to be responsive to ambient motion in a direction along the y axis, but when the force of gravity is pulling up the y axis. The system 1500*b* is oriented to be responsive to ambient motion in a direction along the x axis when the force of gravity pulls to the left along the x axis. Similarly, system 1500*c* is also oriented to be responsive to ambient motion in a direction along the x axis when the force of gravity pulls to the right along the x axis.

Multiaxial harvesting of energy, from ambient motion in a plurality of directions, is useful because an electronic device is not always positioned in the same orientation. In particular, handheld portable electronic devices may be positioned at various orientations during any given period of time. Consider a user carrying around such a device; the device may be positioned in any number of orientations. For example, the device may be held substantially upright while in use. The device may be tipped on a side when placed in a bag. The device may be inadvertently turned upside down when the user puts the device in a pocket. In all these various orientations, the pull of gravity may effect the efficient generation of electrical energy by an electrical generator. When a system has a plurality of electrical generators each oriented in different direction, as in FIG. 15, electricity can be efficiently generated regardless of the orientation.

The illustrated embodiment 1500 is not readily identified as being configured to be responsive to motion along the z axis. As depicted, none of the four systems 1500*a*, 1500*b*, 1500*c*, and 1500*d* are oriented to respond to movement and the pull of gravity along the z axis. As can be appreciated by those of skill in the art, however, additional systems may be added to enable generation of electrical energy in response to movements along the z axis.

Figure 16:
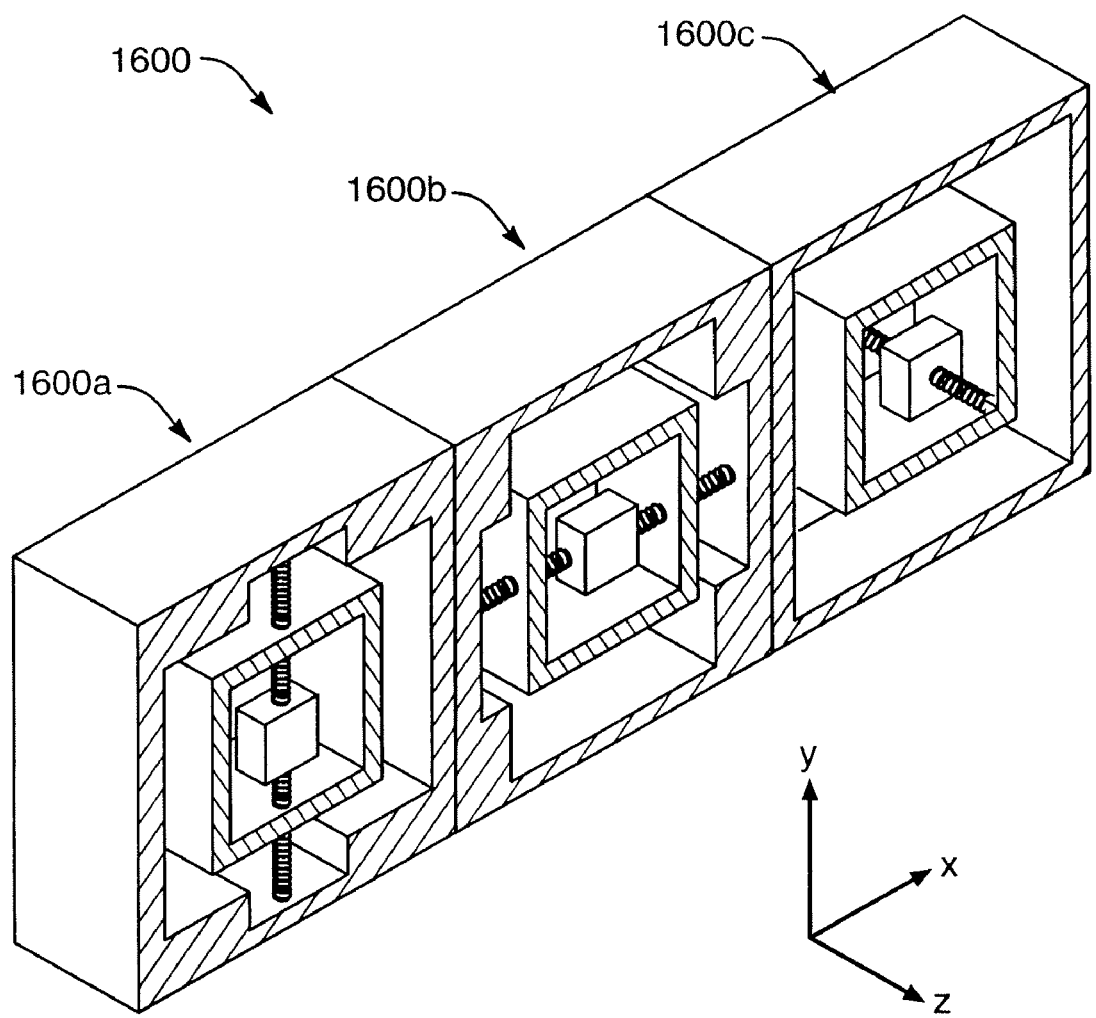
FIG. 16 is a perspective cut-away view of still another embodiment of a system for generating electrical energy from multiaxial ambient energy.

FIG. 16 is a perspective cut-away view of another embodiment of a system for generating electrical energy from multiaxial ambient motion. System 1600 comprises three systems 1600*a*, 1600*b*, and 1600*c* for generating electrical energy from ambient motion, each oriented to most be most effective when driven by ambient motions in an orthogonal direction. As shown, each of the three systems comprise a kinetic energy conversion system and an electrical generator.

The kinetic energy conversion systems of each of the three systems comprise two biasing elements. The biasing elements are springs and are positioned on polar opposite sides of the driving mass, providing further support to suspend and oscillate the driving mass. The suspension support from the additional biasing element reduces the impact of gravity in a direction lateral to the biasing elements.

The electrical generator of each of the three systems comprises a velocity-damped resonant generator. As depicted, the electrical generators also comprise two biasing elements, each of which are springs. The springs can be positioned on polar opposite sides of the magnet, providing further support to suspend and oscillate the magnet. Again, the suspension support from each additional biasing element reduces the impact of gravity in a direction lateral to that additional biasing element. As depicted, the additional biasing element in conjunction with the original biasing element, can act to suspend the magnet regardless of the direction of the pull of gravity.

Each of the three systems can be oriented to most efficiently harvest kinetic energy from motion along either an axis x, an axis y, or an axis z. For example, the system 1600a can be oriented to be most responsive to motion along the y axis, the system 1600b can be oriented to be most responsive to motion along the x axis, and the system 1600c can be oriented to be most responsive to motion along the z axis. The direction of most efficient electrical generation can depend on the positioning of the coil relative to the magnetic field. Efficient electrical generation generally occurs as the magnetic field moves perpendicular to the coil.

Moreover, as depicted, each of the three systems comprises an additional biasing element as part of both the first stage kinetic energy conversion system and the second stage resonating electrical generator. The additional biasing elements enable the systems to be responsive to ambient motion along a particular axis, regardless of the direction of the pull of gravity. For example, the system 1600a can be responsive to motion along the y axis, regardless or whether the pull of gravity is down the y axis, up the y axis, or along the x or z axes. The system 1600 can also be responsive to motion along the x or z axes if one or more coils are positioned accordingly.

Multiaxial harvesting of energy, from ambient motion in a plurality of directions, is useful because ambient motion is not always in a single direction. As an example, a user of an mp3 player may subject the mp3 player to a variety of ambient motions in a plurality of directions that could drive generation of electrical energy. The user may walk to the bus stop. The up and down motion of walking could be harvested by a system for generating electrical energy from ambient motion such as system 1600a that is oriented to be responsive to up and down motion. Once the user gets on the bus, the starting and stopping of the bus produces ambient motion that could be harvested by system 1600c. Similarly, motion resulting from the forces associated with the bus turning may be harvested by system 1600b. The system can also harvest the vector component of any motion aligned parallel to systems 1600a, 1600b, 1600c that results from the bus hitting bumps or the vibrations from the bus. Thus, without changing the orientation of the mp3 player, ambient motions in a variety of directions can efficiently generate electrical energy. Moreover, the user may not always carry the mp3 player at the same orientation. The user may customarily carry the mp3 player in a pocket of a backpack. The pocket may be loose enough to hold the mp3 player in a variety of positions. Were the orientation of the device to change, the different orientations of the systems for generating electrical energy from ambient motion 1600a, 1600b, and 1600c can still efficiently generate electrical energy in response to ambient motion in line with the orientation or each.

Figure 17:
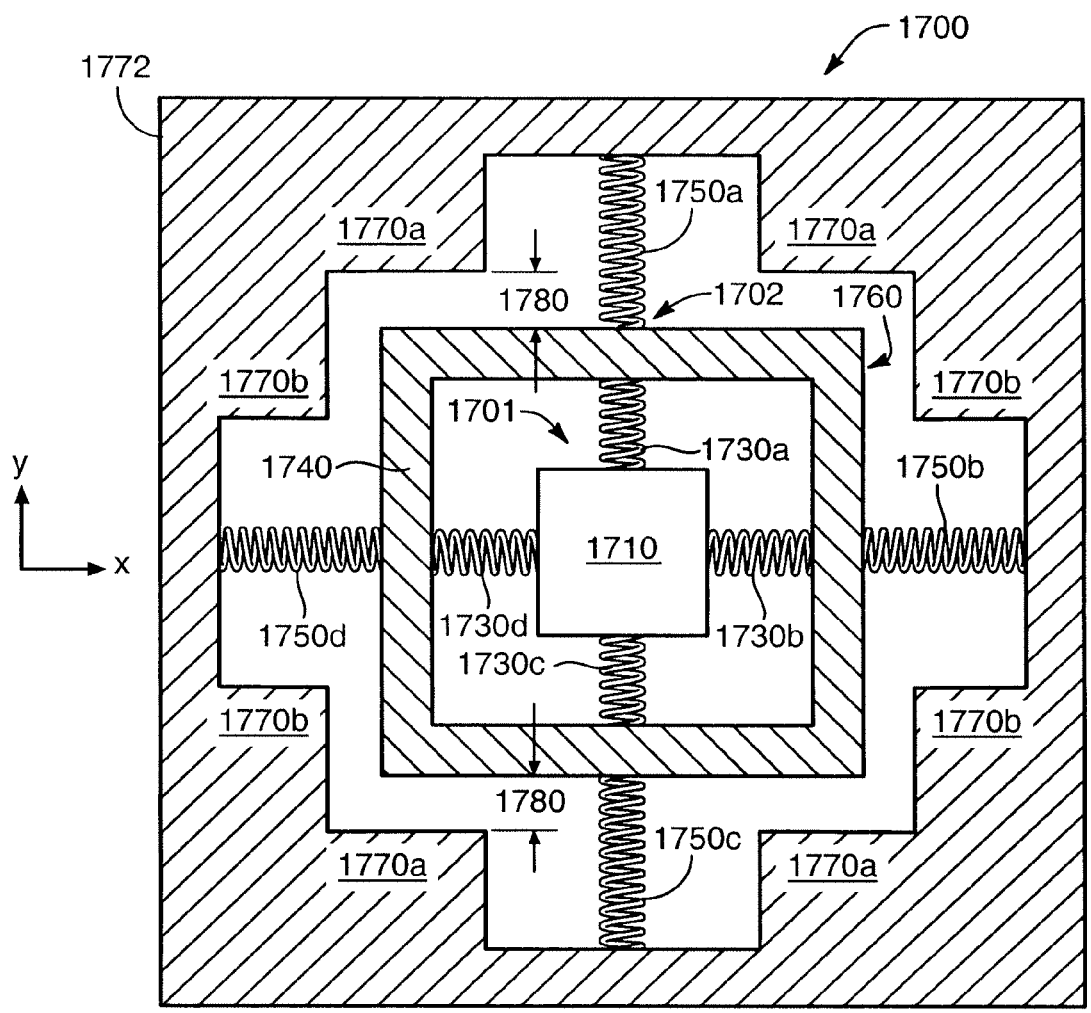
FIG. 17 is a cross-sectional side view of still another embodiment of a system for generating electrical energy from multiaxial ambient energy.

FIG. 17 is a cross-sectional side view of another embodiment of a system for generating electrical energy from multiaxial ambient motion 1700. The embodiment 1700 comprises two stages: an electrical generator 1701 and a kinetic energy conversion system 1702. The kinetic energy conversion system 1702 can comprise a single driving mass 1760 and multiple spring biasing elements 1750a, 1750b, 1750c, 1750d. The multiple spring biasing elements 1750a, 1750b, 1750c, 1750d can each be configured to enable resonant oscillation in response to multiaxial ambient motion. Multiple stops 1770 may be provided to transfer energy harvested from motion along multiple axes. For example, stops 1770a are configured to facilitate harvesting ambient motion along an axis y, while stops 1770b are configured to facilitate harvesting ambient motion along an axis x. Although the cross sectional view only depict an embodiment responsive to movement along the x axis and the y axis, the concept is easily extended to be responsive to movement in a third direction along an axis z.

Similarly, the electrical generator 1701 may comprise a vibration-driven electrical generator. As depicted, a type of velocity-damped resonant generator may be utilized, the generator comprising a single magnet 1710, a coil (not depicted) and multiple spring biasing elements 1730a, 1730b, 1730c, 1730d. The multiple spring biasing elements 1730a, 1730b, 1730c, 1730d can be configured to permit high frequency oscillation of magnet 1710 in multiple directions. Again, although a two-directional embodiment is portrayed, the concepts can easily be extended to a third direction along the z axis.

Figure 18:
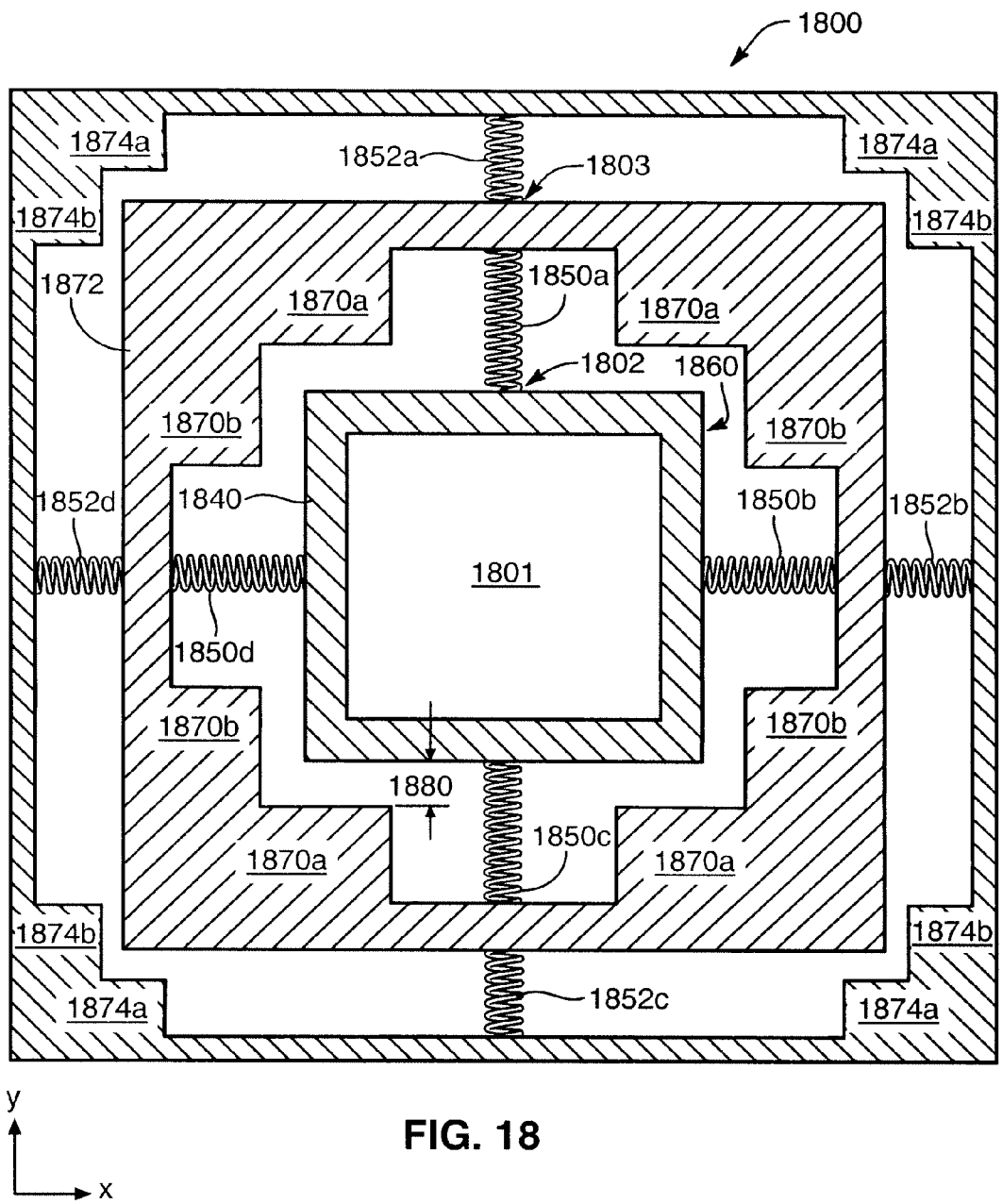
FIG. 18 is a cross-sectional side view of still another embodiment of a system for generating electrical energy from multiaxial ambient energy.

FIG. 18 is a cross-sectional side view of still another embodiment 1800 of a system for generating electrical energy from multiaxial ambient energy. The embodiment 1800 comprises three stages: an electrical generator 1801, a first kinetic energy conversion system 1802, and a second kinetic energy conversion system 1803. FIG. 18 depicts how stages can be nested within stages. The first kinetic energy conversion system 1802 is nested within the second kinetic energy conversion system 1803. Energy from low frequency ambient motion is harvested by the second kinetic energy conversion system 1803 and transferred to the first kinetic energy conversion system 1802 by generating an oscillation at the resonant frequency of the first kinetic energy conversion system 1802. Energy from slightly higher frequency ambient motion, at the resonant frequency of the first kinetic energy conversion system 1802, can also be harvested by the first kinetic energy conversion system 1802. As before, harvested energy is transferred from the first kinetic energy conversion system 1802 to the electrical generator 1801.

The electrical generator 1801 may comprise any generator capable of generating electrical energy from ambient motion. The cross-sectional view does not depict the components of the electrical generator 1801. Rather, the electrical generator 1801 is depicted as a "black box," again to indicate that the electrical generator 1801 may comprise any vibration-driven electrical generator. For example the electrical generator 1801 can be a vibration-driven electrical generator based on electromagnetic, electrostatic, or piezoelectric technologies. If based on electromagnetic technology, the electrical generator 1401 can include any velocity-damped resonant-generator, including the spring, magnet, and coil generators previously discussed. If based on electrostatic technology, the electrical generator 1401 may include a Coulomb-damped resonant-generator and a Coulomb-force parametric-generator.

The first kinetic energy conversion system 1802 can comprise a single driving mass 1860 and multiple spring biasing elements 1850a, 1850b, 1850c, 1850d. The driving mass 1860 comprises the electrical generator 1801. The multiple spring biasing elements 1850a, 1850b, 1850c, 1850d can each be configured to enable resonant oscillation in response to multiaxial ambient motions. Multiple stops 1870 may be provided to transfer energy harvested from motion along multiple axes. For example, stops 1870a are configured to facilitate harvesting ambient motions along an axis y, while stops 1870b are configured to facilitate harvesting ambient motions along an axis x. Although the cross sectional view can only adequately depict an embodiment that is responsive to movement along the x axis and the y axis, the concept is easily extended to be equally responsive to movement in a third direction along an axis z.

The first kinetic energy conversion system 1802 can be driven by ambient motions at its resonant frequency, as in previously described embodiments. The resonant frequency of the first system 1802 can be lower than the resonant frequency of the electrical generator 1801, yet higher than the resonant frequency of the second kinetic energy conversion system 1803. The second kinetic energy conversion system 1803 may be unresponsive to ambient motions at the higher frequency of the first system 1802. Accordingly, at this higher frequency, only first kinetic energy conversion system 1802 may be excited. Ambient motions at the resonant frequency of the first system 1802 can cause the driving mass 1860 to displace the biasing members 1850 and generate resonant oscillations which store strain energy. The harvested energy can be imparted to the electrical generator 1801 to drive generation of electrical energy. The energy harvested by the first system 1802 is imparted to the electrical generator, as before, by the driving mass 1860 colliding with one or more of the stops 1870.

The first kinetic energy conversion system 1802 can also be driven by energy harvested by the second kinetic energy conversion system 1803. The second system 1803 can harvest energy from lower frequency ambient motions. The first system 1802 may be unresponsive to ambient motions at the lower frequency. Accordingly, the second system 1803 harvests the energy from the ambient motions at the lower frequency and imparts the harvested energy to drive resonant oscillations of the first kinetic energy conversion system 1802 at the higher natural frequency of the first system 1802.

The second kinetic energy conversion system 1803 can comprise a single driving mass 1862 and multiple spring biasing elements 1852a, 1852b, 1852c, 1852d. The multiple spring biasing elements 1852a, 1852b, 1852c, 1852d can each be configured to enable resonant oscillation in response to multiaxial ambient motion. Multiple stops 1874 may be provided to transfer energy harvested from motion along multiple axes. For example, stops 1874a are configured to facilitate harvesting energy from ambient motions along an axis y, while stops 1874b are configured to facilitate harvesting energy from ambient motions along an axis x. Although the cross sectional view can only adequately depict an embodiment that is responsive to movement along the x axis and the y axis, the concept is easily extended to be equally responsive to movement in a third direction along an axis z.

The driving mass 1862 of the second kinetic energy conversion system 1803 can comprise the first kinetic energy conversion system 1802 and housing 1872. In this manner, the first system 1802 is nested within the second system 1803. Nesting of kinetic energy conversion systems enables harvesting over a range of frequencies of ambient motions. As described above, the first kinetic energy conversion system 1802 is tuned to be responsive to ambient motions at a particular frequency. The second kinetic energy conversion system is tuned to be responsive to ambient motions at a lower frequency. Thus, the system 1800 is able to harvest energy from ambient motions at a plurality of frequencies. The energy harvested by the second kinetic energy conversion system 1803 is transferred to the first kinetic energy conversion system when the driving mass 1862 strikes the stops 1874, similar to the manner in which harvested energy is transferred from the first kinetic energy conversion system 1802 to the electrical generator 1801.

Although only two kinetic energy conversion systems are depicted in FIG. 18, one of skill in the art can appreciate that more stages can be nested together. A kinetic energy conversion system can be nested within another kinetic energy conversion system having a lower natural resonant frequency. In that manner, energy harvested from lower frequency ambient motion can be used to drive resonant oscillations at the higher frequency of the corresponding nested system, and so on. Eventually, the most interior nested system transfers harvested energy to one or more electrical generators.

Figure 19:
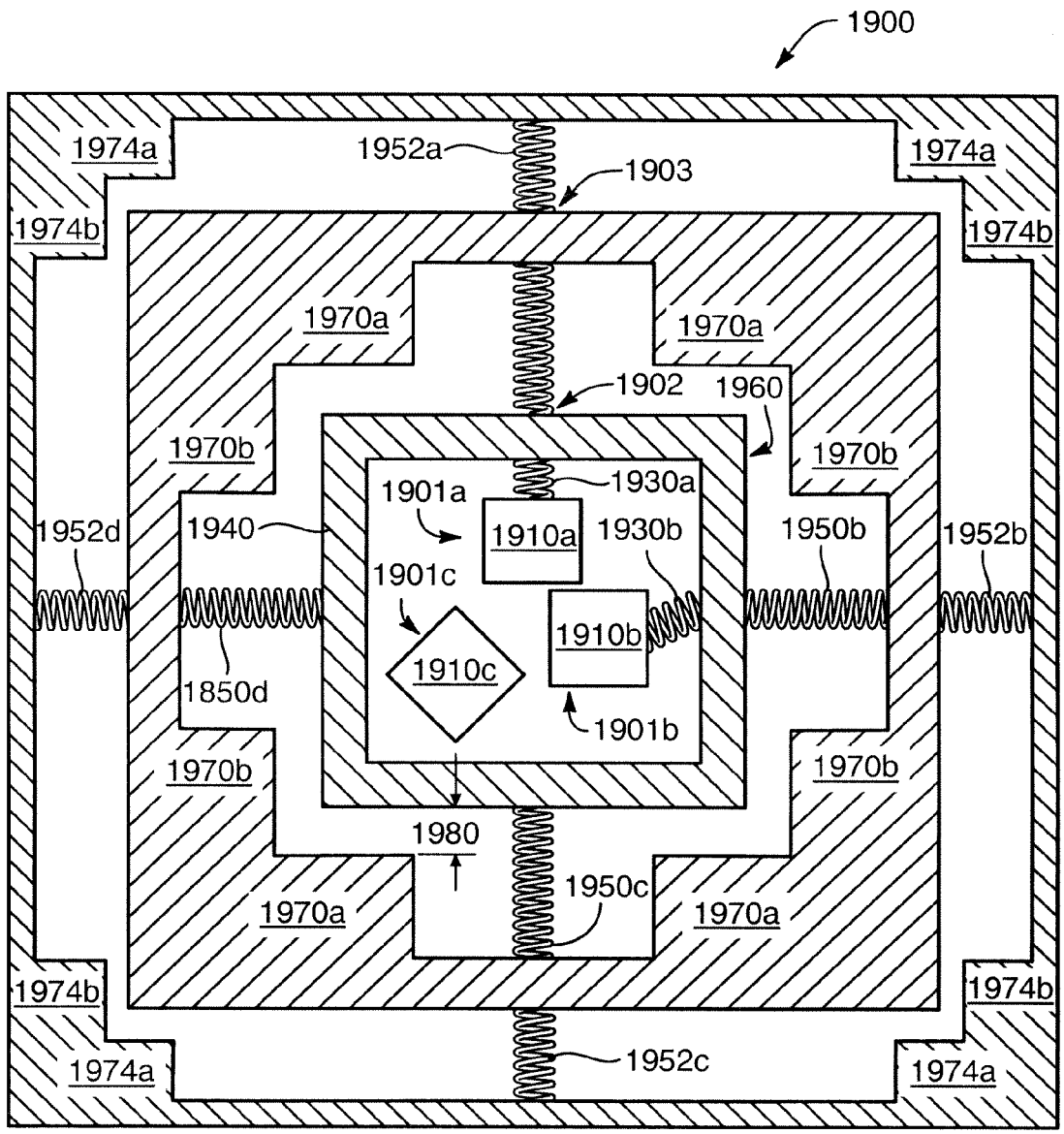
FIG. 19 is a cross-sectional side view of still another embodiment of a system for generating electrical energy from multiaxial ambient energy.
Figure 19:
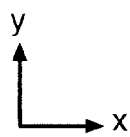

FIG. 19 is a cross-sectional side view of still another embodiment 1900 of a system for generating electrical energy from multiaxial ambient energy. The embodiment 1900 comprises a plurality of kinetic energy conversion systems 1902, 1903 and a plurality of electrical generators 1901a, 1901b, 1901c. The kinetic energy conversion systems 1902, 1903 are nested as described in conjunction with FIG. 18 and depicted therein. In the illustrated embodiment 1900, the first kinetic energy conversion system 1902 comprises a driving mass 1960, which further comprises the plurality of electrical generators 1901a, 1901b, 1901c.

The electrical generators 1901a, 1901b, 1901c each comprise a velocity-damped resonant generator. Each generator 1901a, 1901b, 1901c has a biasing member 1930a, 1930b, (biasing member of generator 1901c is not shown), a magnet 1910a, 1910b, 1910c, and a coil (not depicted). The generators 1901a, 1901b, 1901c are arranged to be responsive to ambient motion and gravity in a different direction. The generator 1901a is configured to generate electrical energy in response to ambient motion in a direction along an axis y when the force of gravity is pulling down the y axis as depicted. The generator 1901b is configured to generate electrical energy in response to ambient motion in a direction along an axis x when the force of gravity is pulling left along the x axis. The generator 1901c is configured to be responsive to ambient motion in a direction along an axis z when the force of gravity is pulling out from the page along the z axis.

Energy harvested by the kinetic energy conversion systems 1902, 1903 can be imparted to the plurality of electrical generators 1901a, 1901b, 1901c. The harvested energy is imparted as before, when the driving mass 1960 collides with the stops 1970. The imparted energy can drive resonant oscillations of one or more of the electrical generators 1901a, 1901b, 1901c to then generate electrical energy.

As will be appreciated by one of skill in the art, the electrical generators of other embodiments may comprise a plurality of biasing members, such as depicted in FIG. 16. In still another embodiment, the electrical generators may be a different type of vibration-driven resonant generator. For example, the electrical generators may comprise any vibration-driven electrical generator based on electromagnetic, electrostatic, or piezoelectric technologies, including any velocity-damped resonant-generator having a spring, magnet, and coil assembly, a Coulomb-damped resonant-generator and a Coulomb-force parametric-generator.

Figure 20:
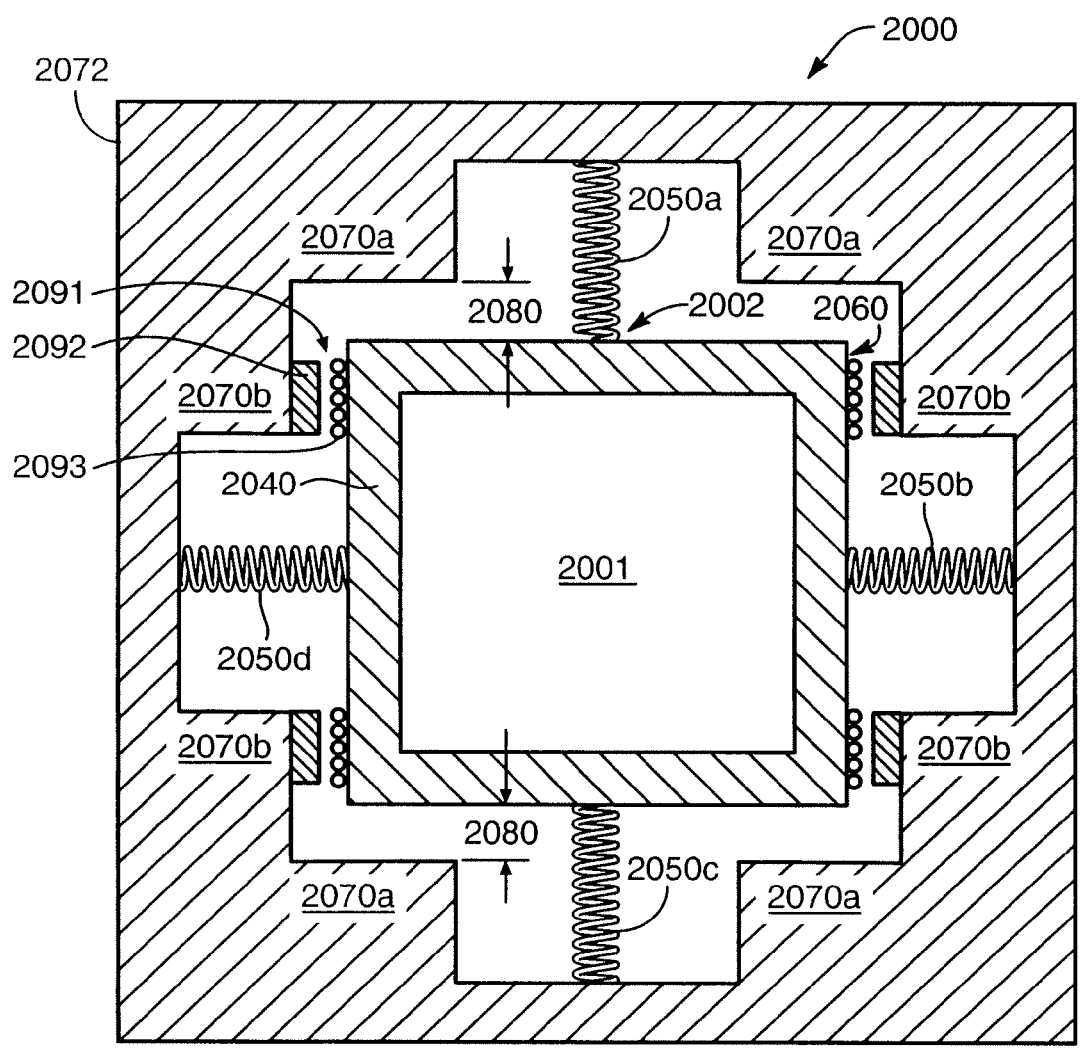
FIG. 20 is a cross-sectional side view of still another embodiment of a system for generating electrical energy from multiaxial ambient energy.

FIG. 20 is a cross-sectional side view of still another embodiment 2000 of a system for generating electrical energy from multiaxial ambient energy. The embodiment 2000 comprises kinetic energy conversion system 2002, and a plurality of electrical generators 2001, 2091. The kinetic energy conversion system 2002 can be similar to embodiments described above, comprising a plurality of biasing elements 2050, a driving mass 2060, and a plurality of stops 2070. Energy is imparted to the electrical generator 2001 when the driving mass 2060 strikes the plurality of stops 2070.

The electrical generator 2001 can comprise any vibration-driven electrical generator based on electromagnetic, electrostatic, or piezoelectric technologies. For example, if based on electromagnetic technology, the electrical generator 1401 can include any velocity-damped resonant-generator, including the spring, magnet, and coil generators previously discussed. If based on electrostatic technology, the electrical generator 1401 may include a Coulomb-damped resonant-generator and a Coulomb-force parametric-generator.

The embodiment 2000 can comprise one or more additional electrical generators 2091 as well. For sake of simplicity, only one such additional electrical generator 2091 has been designated in FIG. 20. A person of skill in the art, however, will appreciate the numerous locations at which further additional electrical generators may be positioned. As depicted, the additional electrical generators 2091 can be magnet and coil type velocity-damped resonant generators. A magnet can be integrated with either the driving mass 2060 or a housing 2072 and/or step 2070 of the kinetic energy conversion system 2002. A coil can be integrated with the other. In the illustrated embodiment, a magnet 2092 is coupled to the step 2070b and/or the housing 2072 of the kinetic energy conversion system 2002. A coil 2093 is coupled to the driving mass 2060 of the kinetic energy conversion system 2002. As the driving mass oscillates in response to ambient motions, the magnetic field of the magnet 2092 moves relative to the coil 2093. Movement of the magnetic field relative to the coil 2093 generates electrical current in the coil. Resonant oscillation of the driving mass 2060 will typically be at a lower frequency, near the frequency of ambient motion. The lower frequency may not be in the range of efficient generation of electrical energy. However, some additional electrical energy can be generated to supplement the electrical energy generated by electrical generator 2001.

Various modifications, changes, and variations apparent to those of skill in the art may be made in the arrangement, operation, and details of the methods and systems of the disclosure without departing from the spirit and scope of the disclosure. Thus, it is to be understood that the embodiments described above have been presented by way of example, and not limitation, and that the invention is defined by the appended claims.

What is claimed is:

1. A system for generating electrical energy from ambient energy, the system comprising:
   a first biasing element configured to store potential energy when forced from a resting position to a strained position;
   a driving mass coupled to the first biasing element, the driving mass configured to harvest ambient energy by forcing the first biasing element from a resting position to a strained position in response to ambient energy, wherein the driving mass further comprises a vibration-driven electrical generator; and
   one or more stops configured to aid in transferring harvested energy to the vibration-driven electrical generator, the one or more stops positioned so that the driving mass can strike the one or more stops upon a sufficient force being applied to the driving mass,
   wherein energy is transferred to the vibration-driven electrical generator upon the driving mass striking the one or more stops and the transferred energy drives the vibration-driven electrical generator to generate electrical energy.

2. The system of claim 1, wherein the first biasing element comprises a spring.

3. The system of claim 1, wherein the first biasing element comprises a cantilever beam.

4. The system of claim 1, wherein the first biasing element comprises a torsion shaft.

5. The system of claim 1, wherein the first biasing element comprises a flexible membrane.

6. The system of claim 1, wherein the vibration-driven electrical generator comprises a velocity-damped resonant generator comprising:
   a coil;
   a second biasing element tuned to a natural frequency that is higher than the natural frequency of the first biasing element; and
   a magnet to generate a magnetic field, the magnet coupled to the second biasing element and disposed in proximity to the coil such that the coil is located within the magnetic field, wherein the second biasing element enables a resonant oscillation of the magnet relative to the coil that generates an electric current in the coil.

7. The system of claim 6, wherein the second biasing element comprises a spring.

8. The system of claim 6, wherein the second biasing element comprises a flexible membrane.

9. The system of claim 6, wherein the second biasing element comprises a cantilever beam.

10. The system of claim 6, wherein the biasing element comprises a torsion shaft.

11. The system of claim 6, wherein the biasing element comprises a flexible membrane.

12. The system of claim 6, wherein the vibration-driven electrical generator further comprises:
    a plurality of coils; and
    one or more additional biasing elements tuned to the natural frequency of the second biasing element and configured to facilitate oscillations of the magnet along a plurality of axes to generate electrical energy in the plurality of coils.

13. The system of claim 1, wherein the vibration-driven electrical generator comprises a piezoelectric material.

14. The system of claim 1, wherein the vibration-driven electrical generator comprises a Coulomb-damped resonating generator.

15. The system of claim 1, wherein the vibration-driven electrical generator comprises a Coulomb-force parametric generator.

16. The system of claim 1, wherein the force applied to the driving mass, to cause it to strike the one or more stops, comprises force generated from energy stored and released by the first biasing element.

17. The system of claim 15, wherein the force applied to the driving mass, to cause it to strike the one or more stops, further comprises gravity.

18. The system of claim 1, wherein the force applied to the driving mass, to cause it to strike the one or more stops, comprises force resulting from ambient energy.

19. The system of claim 1, wherein the energy is transferred to the vibration-driven electrical generator by producing a resonant vibration of the vibration-driven electrical generator.

20. The system of claim 1, wherein the energy is transferred to the vibration-driven electrical generator by producing an acceleration that increases the vibration amplitude of the vibration-driven electrical generator.

21. The system of claim 1, further comprising one or more additional biasing elements configured to facilitate harvesting kinetic energy from ambient movements in a plurality of directions, wherein the one or more additional biasing elements are coupled to the driving mass and configured to be forced from a resting position to a strained position by the driving mass in response to ambient motion.

22. A system for generating electrical energy from ambient motion comprising:
an electrical generator to convert motion to electrical energy; and
a kinetic energy conversion system to harvest energy from ambient motion, the conversion system comprising:
a first biasing element to store potential energy when forced from a resting position to a strained position;
a driving mass configured to force the first biasing element from a resting position to a strained position in response to ambient motion; and
one or more stops configured to transfer energy from the kinetic energy conversion system to the electrical generator, wherein the stops are positioned such that the driving mass can strike the one or more stops upon a sufficient force being applied to the driving mass,
wherein the electrical generator is at least partially housed within the driving mass of the kinetic energy conversion system, and
wherein the driving mass, upon striking the one or more stops, transfers energy to the electrical generator to drive the electrical generator and thereby generate electrical energy.

23. The system of claim 22, wherein the kinetic energy conversion system further comprises a plurality of biasing elements to harvest kinetic energy from ambient movements along a plurality of axes, the plurality of biasing elements configured to be force from a resting position to a strained position by the driving mass.

24. The system of claim 22, wherein the vibration-driven electrical generator comprises a velocity-damped resonating generator.

25. The system of claim 22, wherein the vibration-driven electrical generator comprises a piezoelectric material.

26. The system of claim 22, wherein the vibration-driven electrical generator comprises a Coulomb-damped resonating generator.

27. The system of claim 22, wherein the vibration-driven electrical generator comprises a Coulomb-force parametric generator.

28. The system of claim 22, further comprising a second kinetic energy conversion system, the second kinetic energy conversion system comprising:
a second biasing element tuned to resonate at a frequency lower than the frequency of the first biasing element, the second biasing element configured to store potential energy when forced from a resting position to a strained position;
a second driving mass coupled to the second biasing element and configured to force the first biasing element from a resting position to a strained position in response to ambient motion, wherein the second driving mass comprises the first kinetic energy conversion system; and
one or more second stops configured to transfer energy from the second kinetic energy conversion system to the first kinetic energy conversion system, wherein the second stops are positioned such that the second driving mass can strike the one or more second stops upon a sufficient force being applied to the second driving mass, wherein energy is transferred to the first kinetic energy conversion system upon the second driving mass striking the one or more second stops, thereby producing a vibration at the frequency of the biasing element of the first stage.

29. The system of claim 22, further comprising a second vibration-driven electrical generator, the second vibration-driven electrical generator comprising
a magnet to generate a magnetic field; and
a coil positioned within the magnetic field of the magnet;
wherein oscillations of the driving mass of the first kinetic energy conversion system produce movement of the magnet and magnetic field relative to the coil, thereby generating electrical energy within the coil.

30. A multi-module system for generating electrical energy from multiaxial ambient motion comprising:
a plurality of systems for generating electrical energy from ambient motion, wherein the plurality of systems are oriented along a plurality of axes, and wherein each of the plurality of systems comprises:
an electrical generator to convert motion to electrical energy, the electrical generator having:
a coil;
a first biasing element tuned to resonate at a first frequency; and
a magnet generating a magnetic field, the magnet coupled to the first biasing element and disposed in proximity to the coil such that the coil is positioned within the magnetic field, wherein the first biasing element enables a resonant oscillation of the magnet, and wherein movement of the magnet relative to the coil generates an electric current in the coil; and
a kinetic energy conversion system to harvest energy from ambient motion, the conversion system having:
a second biasing element to store potential energy when forced from a resting position to a strained position, the second biasing element tuned to resonate at a second frequency that is lower than the first frequency;
a driving mass configured to force the second biasing element from a resting position to a strained position in response to ambient motion; and
one or more stops adapted to transfer energy from the kinetic energy conversion system to the electrical generator, wherein the stops are positioned such that the driving mass can strike the one or more stops upon a sufficient force being applied to the driving mass,
wherein the electrical generator is at least partially housed within the driving mass of the kinetic energy conversion system, and
wherein the driving mass transfers energy to the electrical generator upon striking the one or more stops, generating a resonant oscillation of the magnet of the electrical generator at the first frequency to drive the electrical generator and thereby generate electrical energy.

31. A system for generating electrical energy from multi-axial ambient motion comprising:
a multiaxial vibration-driven electrical generator to convert multiaxial motion to electrical energy, the generator comprising:
a plurality of coils;
a plurality of biasing elements configured to resonate along a plurality of axes; and
a magnet generating a magnetic field, the magnet coupled to the plurality of biasing elements and disposed in proximity to the plurality of coils such that the plurality coils are located within the magnetic field, wherein the plurality of biasing elements enable resonant oscillation of the magnet relative to the plurality of coils to thereby generate an electric current in the plurality of coils; and a multiaxial kinetic energy conversion system coupled to the multiaxial vibration-driven electrical generator and configured to harvest ambient energy, the kinetic energy conversion system comprising:
  a second plurality of biasing elements to store potential energy when forced from a resting position to a strained position, wherein the second plurality of biasing elements are tuned to resonate at a second frequency near the frequency of ambient motions, the second plurality of biasing elements oriented along a plurality of axes;
  a driving mass configured to force the second plurality of biasing elements from a resting position to a strained position in response to ambient motion; and
  one or more stops adapted to transfer energy from the kinetic energy conversion system to the multiaxial vibration-driven electrical generator, wherein the stops are positioned such that the driving mass can strike the one or more stops upon sufficient force being applied to the driving mass, wherein the multiaxial vibration-driven electrical generator is partially housed by the driving mass of the multiaxial kinetic energy conversion system, and wherein the driving mass, upon striking the one or more stops, transfers energy to the multiaxial vibration-driven electrical generator to drive the generator and thereby generate electrical energy.

32. A method of generating electrical energy from ambient motion comprising:
  harvesting energy from ambient motion by utilizing a kinetic energy conversion system comprising a first biasing element and a driving mass coupled to the first biasing element and adapted to displace the first biasing element from a resting position to a strained position in response to the ambient motion, wherein the first biasing element is tuned to resonate at a first frequency near the frequency of the ambient motion;
  periodically transferring the harvested to a resonating electrical generator that is integrated with the driving mass of the kinetic energy conversion system, wherein the resonating electrical generator comprises a coil, a second biasing element, and a magnet, wherein the second biasing element is tuned to a natural frequency that is higher than the first frequency, wherein the second biasing element is configured to facilitate a resonant oscillation of the magnet, and wherein the magnet produces a magnetic field and the coil is positioned within the magnetic field such that resonant oscillation of the magnet relative to the coil generate electrical energy within the coil.

* * * * *